US008007267B2

(12) United States Patent
Gao et al.

(10) Patent No.: US 8,007,267 B2
(45) Date of Patent: Aug. 30, 2011

(54) SYSTEM AND METHOD FOR MAKING LAB CARD BY EMBOSSING

(75) Inventors: Chuan Gao, Sunnyvale, CA (US); Melvin Yamamoto, Fremont, CA (US)

(73) Assignee: Affymetrix, Inc., Santa Clara, CA (US)

( * ) Notice: Subject to any disclaimer, the term of this patent is extended or adjusted under 35 U.S.C. 154(b) by 50 days.

(21) Appl. No.: 11/761,062

(22) Filed: Jun. 11, 2007

(65) Prior Publication Data

US 2007/0267782 A1 Nov. 22, 2007

Related U.S. Application Data

(63) Continuation-in-part of application No. 11/761,007, filed on Jun. 11, 2007, which is a continuation-in-part of application No. 11/760,948, filed on Jun. 11, 2007, which is a continuation-in-part of application No. 11/553,944, filed on Oct. 27, 2006, said application No. 11/761,007 is a continuation-in-part of application No. 11/760,938, filed on Jun. 11, 2007, which is a continuation-in-part of application No. 11/553,944, filed on Oct. 27, 2006.

(60) Provisional application No. 60/813,547, filed on Jun. 13, 2006, provisional application No. 60/814,014, filed on Jun. 14, 2006, provisional application No. 60/814,316, filed on Jun. 15, 2006, provisional application No. 60/814,474, filed on Jun. 16, 2006, provisional application No. 60/815,506, filed on Jun. 20, 2006, provisional application No. 60/816,099, filed on Jun. 22, 2006, provisional application No. 60/942,792, filed on Jun. 8, 2007, provisional application No. 60/732,538, filed on Nov. 2, 2005.

(51) Int. Cl.
*A21C 11/10* (2006.01)
*A01J 21/00* (2006.01)

(52) U.S. Cl. ......................... 425/290; 425/390; 977/887

(58) Field of Classification Search .................. 425/290, 425/390; 977/887
See application file for complete search history.

(56) References Cited

U.S. PATENT DOCUMENTS 2,371,061 A * 3/1945 Milano ........................ 76/107.1
2,610,419 A * 9/1952 Baumbach ...................... 40/315
3,614,856 A 10/1971 Sanz et al.
3,631,654 A 1/1972 Riely et al.
3,690,836 A 9/1972 Buissiere et al.
3,778,971 A 12/1973 Granger et al.
(Continued)

FOREIGN PATENT DOCUMENTS

EP 0378968 12/1989
(Continued)

OTHER PUBLICATIONS

U.S. Appl. No. 08/992,025, filed Dec. 1997, Anderson et al.
(Continued)

*Primary Examiner* — Yogendra N Gupta
*Assistant Examiner* — Jeremiah Smith
(74) *Attorney, Agent, or Firm* — Steven M. Yee

(57) ABSTRACT

In one aspect of the invention, systems, methods, and devices are provided for creating microfluidic and nanofluidic structures. In some embodiments, such systems, methods, and devices are used to create features with high aspect ratios in lab cards.

17 Claims, 22 Drawing Sheets

U.S. PATENT DOCUMENTS 4,426,451 A 1/1984 Columbus
4,490,216 A 12/1984 McConnell
4,591,550 A 5/1986 Hafeman et al.
4,676,274 A 6/1987 Brown
4,704,353 A 11/1987 Humphries et al.
4,758,786 A 7/1988 Hafeman
4,789,628 A 12/1988 Nayak
4,790,640 A 12/1988 Nason
4,849,330 A 7/1989 Humphries et al.
4,858,883 A 8/1989 Webster
4,883,579 A 11/1989 Humphries et al.
4,911,794 A 3/1990 Parce et al.
4,915,812 A 4/1990 Parce
4,946,795 A 8/1990 Gibbons et al.
4,963,815 A 10/1990 Hafeman
5,053,060 A 10/1991 Kopf-Sill et al.
5,104,792 A 4/1992 Silver et al.
5,126,022 A 6/1992 Soane et al.
5,127,730 A 7/1992 Brelje et al.
5,143,854 A 9/1992 Pirrung et al.
5,164,319 A 11/1992 Hafeman et al.
5,171,132 A 12/1992 Miyazaki et al.
5,188,963 A 2/1993 Stapleton
5,200,313 A 4/1993 Carrico
5,215,131 A 6/1993 Poy
5,219,712 A 6/1993 Evans et al.
5,229,297 A 7/1993 Schnipelsky et al.
5,230,866 A 7/1993 Shartle et al.
5,252,294 A 10/1993 Kroy et al.
5,271,724 A 12/1993 van Lintel
5,277,556 A 1/1994 van Lintel
5,281,516 A 1/1994 Stapleton et al.
5,296,375 A 3/1994 Kricka et al.
5,304,487 A 4/1994 Wilding et al.
5,313,264 A 5/1994 Ivarsson et al.
5,346,672 A 9/1994 Stapleton et al.
5,375,979 A 12/1994 Trah
5,382,511 A 1/1995 Stapleton
5,384,261 A 1/1995 Winkler et al.
5,395,503 A 3/1995 Parce et al.
5,424,186 A 6/1995 Fodor et al.
5,436,129 A 7/1995 Stapleton
5,451,500 A 9/1995 Stapleton
5,486,335 A 1/1996 Wilding et al.
5,498,392 A 3/1996 Wilding et al.
5,500,188 A 3/1996 Hafeman et al.
5,580,523 A 12/1996 Bard
5,585,069 A 12/1996 Zanzucchi
5,587,128 A 12/1996 Wilding et al.
5,589,350 A 12/1996 Bochner
5,591,384 A * 1/1997 Abrams et al. ............... 264/40.5
5,593,130 A 1/1997 Hansson et al.
5,610,010 A 3/1997 Surzycki et al.
5,628,849 A * 5/1997 Fasano et al. ................ 264/614
5,631,134 A 5/1997 Cantor
5,639,423 A 6/1997 Northrup et al.
5,646,039 A 7/1997 Northrup et al.
5,653,939 A 8/1997 Hollis et al.
5,660,993 A 8/1997 Cathey et al.
5,677,195 A 10/1997 Winkler et al.
5,700,637 A 12/1997 Southern
5,726,026 A 3/1998 Wilding et al.
5,843,767 A 12/1998 Beattie
5,856,174 A 1/1999 Lipshutz et al.
5,858,195 A 1/1999 Ramsey
5,863,801 A 1/1999 Southgate
5,866,434 A 2/1999 Massey et al.
5,871,928 A 2/1999 Fodor et al.
5,876,918 A 3/1999 Wainwright et al.
5,882,903 A 3/1999 Andrevski et al.
5,922,591 A 7/1999 Anderson et al.
5,952,173 A 9/1999 Hansmann
5,976,336 A 11/1999 Dubrow et al.
5,980,742 A 11/1999 Saitoh
6,001,229 A 12/1999 Ramsey
6,001,231 A 12/1999 Kopf-Sill
6,010,607 A 1/2000 Ramsey
6,010,608 A 1/2000 Ramsey
6,033,546 A 3/2000 Ramsey
6,040,138 A 3/2000 Lockhart et al.
6,043,080 A 3/2000 Anderson et al.
6,077,674 A 6/2000 Schleifer et al.
6,090,553 A 7/2000 Matson
6,130,098 A 10/2000 Handique et al.
6,143,496 A 11/2000 Brown et al.
6,168,948 B1 1/2001 Anderson et al.
6,186,659 B1 2/2001 Schembri
6,197,595 B1 3/2001 Anderson et al.
6,258,593 B1 7/2001 Schembri
6,271,145 B1 8/2001 Toda
6,326,211 B1 12/2001 Anderson et al.
6,613,513 B1 9/2003 Parce et al.
6,716,629 B2 4/2004 Hess et al.
6,830,936 B2 12/2004 Anderson et al.
6,875,619 B2 4/2005 Blackburn
6,905,816 B2 6/2005 Jacobs et al.
7,033,761 B2 4/2006 Shafer
7,043,939 B2 5/2006 Imahashi
7,129,554 B2 10/2006 Lieber et al.
7,332,127 B2 2/2008 Kim et al.
7,390,457 B2 6/2008 Schembri
7,476,360 B2 1/2009 Gau et al.
7,641,871 B2 1/2010 Futami et al.
2002/0022261 A1 2/2002 Anderson et al.
2002/0055167 A1 5/2002 Pourahmadi et al.
2003/0148362 A1 8/2003 Luka
2005/0034482 A1* 2/2005 Imahashi .......................... 63/37
2005/0100946 A1 5/2005 Lipshutz et al.
2005/0202504 A1 9/2005 Anderson et al.
2005/0250199 A1 11/2005 Anderson et al.
2006/0246490 A1 11/2006 Anderson et al.
2007/0099288 A1 5/2007 Gao et al.
2007/0267335 A1 11/2007 Gao et al.
2007/0267782 A1 11/2007 Gao et al.
2008/0038713 A1 2/2008 Gao et al.
2008/0311585 A1 12/2008 Gao et al.

FOREIGN PATENT DOCUMENTS

WO WO 90/04645 5/1990
WO WO 90/15070 12/1990
WO WO 92/10092 6/1992
WO WO 92/10587 6/1992
WO WO 92/10588 6/1992
WO WO 93/09668 5/1993
WO WO 93/22053 11/1993
WO WO 93/22058 11/1993
WO WO 94/03791 2/1994
WO WO 94/05414 3/1994
WO WO 98/52691 11/1998

OTHER PUBLICATIONS

U.S. Appl. No. 09/519,148, filed Mar. 2000, Lipshutz et al.

Anderson et al., "Microfluidic biochemical analysis system," Technical Digest of Transducers '97, International Conference on Solid-State Sensors and Actuators, Chicago, pp. 477-480 (1977).

Anderson et al., "Microfluidic Genetic Analysis Systems: Improvements and Methods," Abstract for 1998 Solid-State Sensor and Actuator Workshop, 4 pages, Jun. 7-11, 1998.

Anderson et al., "Miniaturized genetic-analysis system," Technical Digest of 1996 Solid-State Sensor and Actuator Workshop, Hilton Head Island, South Carolina, pp. 258-261 (1996).

Andersson et al., "Biological Cell Assays on an Electrokinetic Microchip," Technical Digest of Transducers '97, International Conference on Solid-State Sensors and Actuators, Chicago, pp. 1311-1314 (1997).

Bart et al., "Microfabricated Electrohydrodynamic Pumps," Sensors and Actuators, A21-A23:193-197 (1990).

Bousse et al., "Biosensor for Detection of Enzymes Immbolized in Microvolume Reaction Chambers," Sensors and Actuators, vol. B1, pp. 555-560 (1990).

Dynal Inc., Biomagnetic Techniques in Molecular Biology, A Technical Handbook 3rd Edition pp. 7-10, 48-50, (1998).

Effenhauser et al., "Glass Chips for High-Speed Capillary Electrophoresis Separations with Submicrometer Plate Heights," Anal. Chem., 65:2637-2642 (1993).

Effenhauser et al., "High-Speed Separation of Antisense Oligonucleotides on a Micromachined Capillary Electrophoresis Device," Anal. Chem., 66:2949-2953 (1994).
Fodor et al., "Light-Directed, Spatially Addressable Parallel Chemical Synthesis," Science, 251:767-773 (1991).
Ghandi, VLSI Fabrication Principles, 2nd ed., John Wiley & Sons, Inc., Ch. 10 (1994).
Harrison and Chiem, "Immunoassay flow systems on-chip," Technical Digest of 1996 Solid-State Sensor and Actuator Workshop, Hilton Head Island, South Carolina, pp. 5-8 (1996).
Harrison et al., "Micromachining a Miniaturized Capillary Electrophoresis-Based Chemical Analysis System on a Chip," Science, 261:895-897 (1993).
Hein et al., "Bubble Motion Induced by Marangoni Convection Under the Influence of Gravity," Chem. Eng. Technol. (1998) 21:41-44.
Horowitz and Hill, The Art of Electronics, 2d ed., Cambridge University Press, Ch. 15 (1994).
Jacobsen et al., "High-Speed Separations on a Microchip," Anal. Chem., 66:1114-1118 (1994).
Kenis et al., "Fabrication inside Microchannels Using Fluid Flow," Accounts of Chemical Research, 33, pp. 841-847 (2000).
Kenis et al., "Microfabrication Inside Capillaries Using Multiphase Laminar Flow Patterning," Science, 285, 83-85 (1999).
Li et al., "Transport, manipulation, and reaction of biological cells on-chip using electrokinetic effects," Anal. Chem., vol. 69, No. 8, pp. 1564-1568 (1997).
Luckey et al., "A model for the mobility of single-stranded DNA in capillary gel electrophoresis," Electrophoresis, 14:492-501 (1993).
Man et al., "Microfluidic Plastic Capillaries on Silicon Substrates: A New Inexpensive Technology for Bioanalysis Chips," Proceedings IEEE Tenth Annual International Workshop on Mechanical Systems, Nagoya, Japan, pp. 311-316 (Jan. 26-30, 1997).
Manz et al., "Planar chips technology for miniaturization and integration of separation techniques into monitoring systems: Capillary electrophoresis on a chip," J. Chromatog., 593:253-258 (1992).
Nyborg, "Acoustical streaming," Physical Acoustics, Principles and Methods, vol. 2., Part B, Mason, ed., Academic Press (1965), Chapter 11, pp. 265-333.
Oosterbroek, Preface in Lab-on-a-Chip: miniaturized system for (bio) chemical analysis and synthesis, Elsevier, pp. v-vi (2003).
Owicki et al., "The Light-Addressable Potentiometric Sensor: Principles and Biological Applications," Annu. Rev. Biophys. Biomol. Struct., vol. 23, pp. 87-113 (1994).
Pease et al., "Light-generated oligonucleotide arrays for rapid DNA sequence analysis," PNAS, 91:5022-5026 (1994).
Piezoelectric Technology, Data for Engineers, Clevite Corp.
Richter et al., "A micromachined electrohydrodynamic (EHD) pump," Sensors and Actuators, 29:159-165 (1991).
Richter et al., "An Electrohydrodynamic Micropump," 3rd IEEE Workshop on Micro Electro Mechanical Systems, Feb. 12-14, 1990, Napa Valley.
Staecker et al., "A Procedure for RT-PCR Amplification of mRNAs on Histological Specimens," BioTechniques, vol. 16, No. 1, pp. 76-80 (Jan. 1994).
Stix, "Gene Readers," Scientific American, pp. 149-150 (Jan. 1994).
Woolley and Mathies, "Ultra high-speed DNA fragment separations using microfabricated capillary array electrophoresis chips," PNAS, 91:11348-11352 (1994).
Woolley et al., "Functional integration of PCR amplification and capillary electrophoresis in a microfabricated DNA analysis device," Anal. Chem., vol. 68, No. 23, pp. 4081-4086 (1996).

* cited by examiner

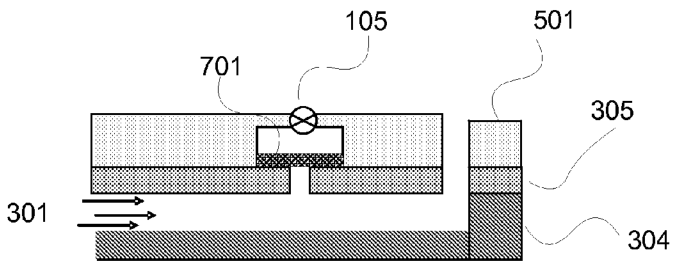
FIG. 7
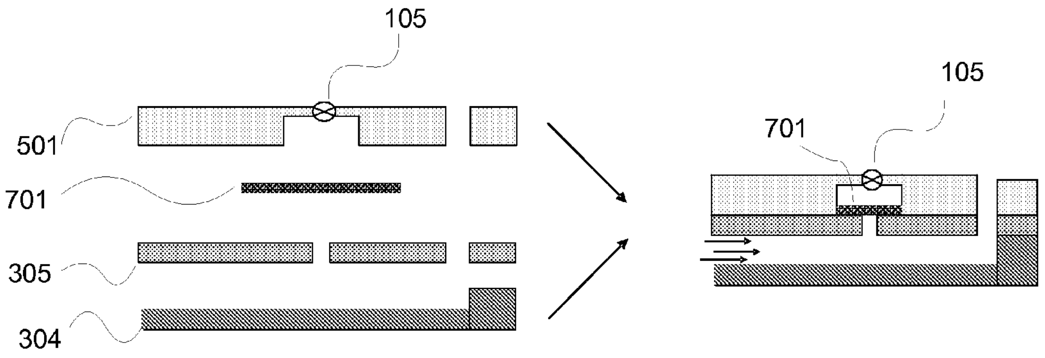
FIG. 8a
FIG. 8b
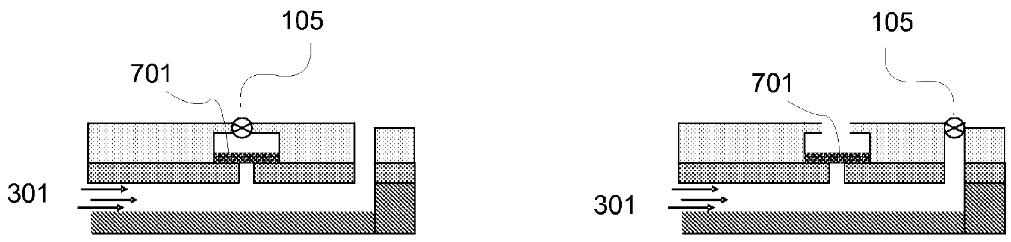
FIG. 8c
FIG. 8d

---Prior Art---

SYSTEM AND METHOD FOR MAKING LAB CARD BY EMBOSSING

RELATED APPLICATIONS

The present application is a continuation in part of U.S. patent application Ser. No. 11/761,007, filed Jun. 11, 2007, which is a continuation in part of U.S. patent application Ser. No. 11/760,948, filed Jun. 11, 2007 and a continuation in part of U.S. patent application Ser. No. 11/760,938, filed Jun. 11, 2007, which both claim priority from U.S. Provisional Patent Application Ser. No. 60/813,547, filed Jun. 13, 2006, and claim priority from U.S. Provisional Patent Application Ser. No. 60/814,014, filed Jun. 14, 2006, and claim priority from U.S. Provisional Patent Application Ser. No. 60/814,316, filed Jun. 15, 2006, and claim priority from U.S. Provisional Patent Application Ser. No. 60/814,474, filed Jun. 16, 2006, and claim priority from U.S. Provisional Patent Application Ser. No. 60/815,506, filed Jun. 20, 2006, and claim priority from U.S. Provisional Patent Application Ser. No. 60/816,099, filed Jun. 22, 2006, and claim priority from U.S. Provisional Patent Application Ser. No. 60/942,792, filed Jun. 11, 2007, and are continuation in part of U.S. patent application Ser. No. 11/553,944, filed Oct. 27, 2006. Each application is hereby incorporated by reference herein in its entirety for all purposes.

BACKGROUND OF THE INVENTION

The present invention relates to the field of embossing technique. For example, the systems, methods and devices of the present invention are applied to making lab cards for biological assays. The field of nucleic acid assays has been transformed by microarrays which allow extremely high-throughput and parallel monitoring of gene expression events, expression profiling, diagnostics and large-scale, high-resolution analyses, among other applications. Microarrays are used in biological research, clinical diagnostics, drug discovery, environmental monitoring, forensics and many other fields.

Current genetic research generally relies on a multiplicity of distinct processes to elucidate the nucleic acid sequences, with each process to introducing a potential for error into the overall process. These processes also draw from a large number of distinct disciplines, including chemistry, molecular biology, medicine and others. It would therefore be desirable to integrate the various process used in genetic diagnosis, in a single process, at a minimum cost, and with a maximum ease of operation.

Interest has been growing in the fabrication of microfluidic devices. Typically, advances in the semiconductor manufacturing arts have been translated to the fabrication of micromechanical structures, e.g., micropumps, microvalves and the like, and microfluidic devices including miniature chambers and flow passages.

A number of researchers have attempted to employ these microfabrication techniques in the miniaturization of some of the processes involved in genetic analysis in particular. Conventional approaches often will inevitably involve extremely complicated fluidic networks as more and more reagents are added into systems, and more samples are processed. By going to a smaller platform, such fluidic complexity brings many concerns such as difficulty in fabrication, higher manufacture cost, lower system reliability, etc. Thus, there's a need to have a simpler way to fabricate micromechanical structures in a controlled fashion. Various embodiments of the present invention meet this and other needs.

BRIEF SUMMARY OF THE INVENTION

An embodiment of the present invention provides systems and methods for embossing techniques for making microfluidic devices, such as lab cards. In one aspect of the present invention, systems, methods, and computer software products are provided for using embossing techniques for making lab cards related to biological assays. Merely by way of example, the invention is described as it applies to making lab cards for preparing nucleic acid samples for hybridization with microarrays, but it should be recognized that the invention has a broader range of applicability.

According to an embodiment of the present invention, an apparatus, method, and system for constructing at least one hole in a substrate are provided which include a mold structure having a top plate, middle plate and a back plate with at least one pin that will penetrate a substrate material during embossing. The top, middle, and back plate are aligned with at least two alignment pins. As the substrate is being held in between the top plate and the middle plate, a delay mechanism is keeping the pin from penetrating through the substrate into a microfeature. A heater is used to heat the mold structure and the substrate to the desired temperature such that material becomes soft and flowing allowing the mold to be filled with the substrate material. At this point in time, the substrate is soft such that the pin is not damaged while constructing at least one hole in the substrate.

In a preferred embodiment of the present invention, the hole that is being created has a high aspect ratio. The aspect ratio is in the range of 1 to 20, preferably in the range of 1 to 50, and most preferably in the range of 1 to 100. According to another embodiment of the present invention, the substrate material is a material with a glass transition temperature, preferably a thermoplastic. According to another embodiment of the present invention, the delay mechanism comprises at least one heating component. In a preferred embodiment, the heating component is at least two spacers having the same glass transition temperature as the substrate.

Thus an object of the present invention is to provide a process and apparatus for efficiently, effectively, and inexpensively creating through holes in microfluidic parts.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1*a* is an image of a layout of a system of channels and valves according to an embodiment of the present invention. FIG. 1*b* illustrates examples of various volumes.

FIG. 7 illustrates an alternative embodiment of a valve mechanism design, a valve utilizing a gas permeable fluid barrier.

FIGS. 8*a*-8*d* illustrate a method for making and using a gas permeable fluid barrier mechanism according to an embodiment of the present invention.

FIG. 9*a* illustrates a diagram of the step where the gate is closed and the valve is open according to an embodiment of the present invention. FIG. 9*b* is a diagram of the step where the gate is opened and the valve is closed according to an embodiment of the present invention.

FIGS. 11*a* and 11*b* illustrate the molding steps of a substrate. FIG. 11*c* illustrates the molded substrate. FIG. 11*d* illustrates the final drilling step in the construction of the through hole.

FIG. 12*a* shows a layout of a system according to an embodiment of the present invention. FIG. 12*b* illustrates a step where a pin penetrates the substrate according to an embodiment of the present invention. FIG. 12*c* illustrates the substrate with the constructed through holes according to an embodiment of the present invention.

FIG. 13*a* shows a plurality of pins stabilized into a plate according to an embodiment of the present invention. FIG. 13*b* illustrates a close up view of the fixture holding the pin wherein the pin is bent at one end according to an embodiment of the present invention.

FIG. 14*a* shows the layout of a system according to an embodiment of the present invention. FIG. 14*b* is a close up view of the delicate nano structure mold according to an embodiment of the present invention. FIG. 14*c* illustrates a step where a pin with the nano structure imprints onto the substrate according to an embodiment of the present invention. FIG. 14*d* illustrates the substrate with the imprinted nano structures according to an embodiment of the present invention. FIG. 14*e* illustrates a close up view of the imprinted nano structures according to an embodiment of the present invention.

FIG. 19*a* illustrates an image of a chip-to-chip interface structure using a gasket according to an embodiment of the present invention. FIG. 19*b* illustrates two lab cards that are in the process of being connected according to an embodiment of the present invention. FIG. 19*c* illustrates the connection of the two lab cards according to an embodiment of the present invention.

FIG. 21*a* illustrates a front view of the overall system according to an embodiment of the present invention. FIG. 21*b* illustrates a side view of the overall system according to an embodiment of the present invention. FIG. 21*c* illustrates a top view of the overall system according to an embodiment of the present invention. FIG. 21*d* illustrates a bottom view of the overall system according to an embodiment of the present invention. FIG. 21*e* illustrates a bottom view of the overall system according to an embodiment of the present invention.

DETAILED DESCRIPTION OF THE INVENTION

I. General Description

Figure 1A:
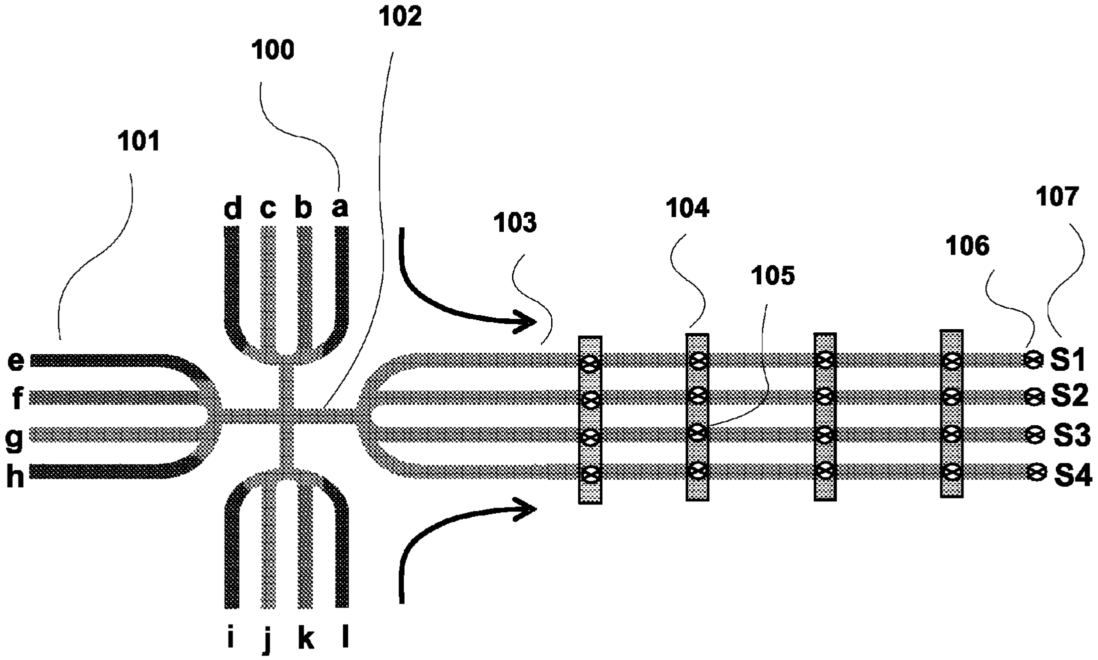
FIGS. 1*a*-1*b* illustrate a system of channels and valves for introducing multiple samples and performing a number of reactions and steps according to an embodiment of the present invention.

The present invention cites certain patents, applications and other references. When a patent, application, or other reference is cited or repeated below, it should be understood that it is incorporated by reference in its entirety for all purposes as well as for the proposition that is recited.

As used in this application, the singular form "a," "an," and "the" include plural references unless the context clearly dictates otherwise. For example, the term "an agent" includes a plurality of agents, including mixtures thereof.

An individual is not limited to a human being but may also be other organisms including but not limited to mammals, plants, bacteria, or cells derived from any of the above.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The practice of the present invention may employ, unless otherwise indicated, conventional techniques and descriptions of organic chemistry, polymer technology, molecular biology (including recombinant techniques), cell biology, biochemistry, and immunology, which are within the skill of the art. Such conventional techniques include polymer array synthesis, hybridization, ligation, and detection of hybridization using a label. Specific illustrations of suitable techniques can be had by reference to the example herein below. However, other equivalent conventional procedures can, of course, also be used. Such conventional techniques and descriptions can be found in standard laboratory manuals such as *Genome*

*Analysis: A Laboratory Manual Series* (*Vols. I-IV*), *Using Antibodies: A Laboratory Manual, Cells: A Laboratory Manual, PCR Primer: A Laboratory Manual*, and *Molecular Cloning: A Laboratory Manual* (all from Cold Spring Harbor Laboratory Press), Stryer, L. (1995) *Biochemistry* (4th Ed.) Freeman, New York, *Gait, "Oligonucleotide Synthesis: A Practical Approach"* 1984, IRL Press, London, Nelson and Cox (2000), Lehninger, *Principles of Biochemistry* $3^{d}$ Ed., W.H. Freeman Pub., New York, N.Y. and Berg et al. (2002) *Biochemistry,* $5^{th}$ Ed., W.H. Freeman Pub., New York, N.Y., all of which are herein incorporated in their entirety by reference for all purposes.

The present invention can employ solid substrates, including arrays in some preferred embodiments. Methods and techniques applicable to polymer (including protein) array synthesis have been described in U.S. Ser. No. 09/536,841, WO 00/58516, U.S. Pat. Nos. 5,143,854, 5,242,974, 5,252,743, 5,324,633, 5,384,261, 5,405,783, 5,424,186, 5,451,683, 5,482,867, 5,491,074, 5,527,681, 5,550,215, 5,571,639, 5,578,832, 5,593,839, 5,599,695, 5,624,711, 5,631,734, 5,795,716, 5,831,070, 5,837,832, 5,856,101, 5,858,659, 5,936,324, 5,968,740, 5,974,164, 5,981,185, 5,981,956, 6,025,601, 6,033,860, 6,040,193, 6,090,555, 6,136,269, 6,269,846 and 6,428,752, in PCT Applications Nos. PCT/US99/00730 (International Publication Number WO 99/36760) and PCT/US01/04285 (International Publication Number WO 01/58593), which are all incorporated herein by reference in their entirety for all purposes.

Patents that describe synthesis techniques in specific embodiments include U.S. Pat. Nos. 5,412,087, 6,147,205, 6,262,216, 6,310,189, 5,889,165, and 5,959,098.

Nucleic acid arrays are described in many of the above patents, but the same techniques are applied to polypeptide arrays.

Nucleic acid arrays that are useful in the present invention include those that are commercially available from Affymetrix (Santa Clara, Calif.) under the brand name GeneChip®.

The present invention also contemplates many uses for polymers attached to solid substrates. These uses include gene expression monitoring, profiling, library screening, genotyping and diagnostics. Gene expression monitoring and profiling methods can be shown in U.S. Pat. Nos. 5,800,992, 6,013,449, 6,020,135, 6,033,860, 6,040,138, 6,177,248 and 6,309,822. Genotyping and uses therefore are shown in U.S. Ser. Nos. 15 10/442,021, 10/013,598 (U.S. Patent Application Publication 20030036069), and U.S. Pat. Nos. 5,856,092, 6,300,063, 5,858,659, 6,284,460, 6,361,947, 6,368,799 and 6,333,179. Other uses are embodied in U.S. Pat. Nos. 5,871,928, 5,902,723, 6,045,996, 5,541,061, and 6,197,506.

The present invention also contemplates sample preparation methods in certain preferred embodiments. Prior to or concurrent with genotyping, the genomic sample may be amplified by a variety of mechanisms, some of which may employ PCR. See, e.g. *PCR Technology: Principles and Applications for DNA Amplification* (Ed. H. A. Erlich, Freeman Press, NY, N.Y., 1992); *PCR Protocols: A Guide to Methods and Applications* (Eds. Innis, et al., Academic Press, San Diego, Calif., 1990); Mattila et al., *Nucleic Acids Res.* 19, 4967 (1991); Eckert et al., *PCR Methods and Applications* 1, 17 (1991); *PCR* (Eds. McPherson et al., IRL Press, Oxford); and U.S. Pat. Nos. 4,683,202, 4,683,195, 4,800,159 4,965,188, and 5,333,675, and each of which is incorporated herein by reference in their entireties for all purposes. The sample may be amplified on the array. See, for example, U.S. Pat. No. 6,300,070 and U.S. Ser. No. 09/513,300, which are incorporated herein by reference.

Other suitable amplification methods include the ligase chain reaction (LCR) (e.g., Wu and Wallace, *Genomics* 4, 560 (1989), Landegren et al., *Science* 241, 1077 (1988) and Barringer et al. *Gene* 89:117 (1990)), transcription amplification (Kwoh et al., *Proc. Natl. Acad. Sci.* USA 86, 1173 (1989) and WO88/10315), self-sustained sequence replication (Guatelli et al., *Proc. Nat. Acad. Sci.* USA, 87, 1874 (1990) and WO90/06995), selective amplification of target polynucleotide sequences (U.S. Pat. No. 6,410,276), consensus sequence primed polymerase chain reaction (CP-PCR) (U.S. Pat. No. 4,437,975), arbitrarily primed polymerase chain reaction (AP-PCR) (U.S. Pat. Nos. 5,413,909, 5,861,245) and nucleic acid based sequence amplification (NABSA). (See, U.S. Pat. Nos. 5,409,818, 5,554,517, and 6,063,603, each of which is incorporated herein by reference). Other amplification methods that may be used are described in U.S. Pat. Nos. 5,242,794, 5,494,810, 4,988,617 and in U.S. Ser. No. 09/854,317, each of which is incorporated herein by reference.

Additional methods of sample preparation and techniques for reducing the complexity of a nucleic sample are described in Dong et al., *Genome Research* 11, 1418 (2001), in U.S. Pat. Nos. 6,361,947, 6,391,592 and U.S. Ser. Nos. 09/916,135, 09/920,491 (U.S. Patent Application Publication 20030096235), 09/910,292 (U.S. Patent Application Publication 20030082543), and 10/013,598.

Methods for conducting polynucleotide hybridization assays have been well developed in the art. Hybridization assay procedures and conditions will vary depending on the application and are selected in accordance with the general binding methods known including those referred to in: Maniatis et al. *Molecular Cloning: A Laboratory Manual* ($2^{nd}$ Ed. Cold Spring Harbor, N.Y., 1989); Berger and Kimmel *Methods in Enzymology*, Vol. 152, *Guide to Molecular Cloning Techniques* (Academic Press, Inc., San Diego, Calif., 1987); Young and Davism, *P.N.A.S.* 80: 1194 (1983). Methods and apparatus for carrying out repeated and controlled hybridization reactions have been described in U.S. Pat. Nos. 5,871,928, 5,874,219, 6,045,996 and 6,386,749, 6,391,623 each of which are incorporated herein by reference.

The present invention also contemplates signal detection of hybridization between ligands in certain preferred embodiments. See U.S. Pat. Nos. 5,143,854, 5,578,832; 5,631,734; 5,834,758; 5,936,324; 5,981,956; 6,025,601; 6,141,096; 6,185,030; 6,201,639; 6,218,803; and 6,225,625, in U.S. Ser. No. 10/389,194 and in PCT Application PCT/US99/06097 (published as W099/47964), each of which also is hereby incorporated by reference in its entirety for all purposes.

Methods and apparatus for signal detection and processing of intensity data are disclosed in, for example, U.S. Pat. Nos. 5,143,854, 5,547,839, 5,578,832, 5,631,734, 5,800,992, 5,834,758; 5,856,092, 5,902,723, 5,936,324, 5,981,956, 6,025,601, 6,090,555, 6,141,096, 6,185,030, 6,201,639; 6,218,803; and 6,225,625, in U.S. Ser. Nos. 10/389,194, 60/493,495 and in PCT Application PCT/US99/06097 (published as W099/47964), each of which also is hereby incorporated by reference in its entirety for all purposes.

The practice of the present invention may also employ conventional biology methods, software and systems. Computer software products of the invention typically include computer readable medium having computer-executable instructions for performing the logic steps of the method of the invention. Suitable computer readable medium include floppy disk, CD-ROM/DVD/DVD-ROM, hard-disk drive, flash memory, ROM/RAM, magnetic tapes and etc. The computer executable instructions may be written in a suitable computer language or combination of several languages. Basic computational biology methods are described in, e.g.

Setubal and Meidanis et al., *Introduction to Computational Biology Methods* (PWS Publishing Company, Boston, 1997); Salzberg, Searles, Kasif, (Ed.), *Computational Methods in Molecular Biology*, (Elsevier, Amsterdam, 1998); Rashidi and Buehler, *Bioinformatics Basics: Application in Biological Science and Medicine* (CRC Press, London, 2000) and Ouelette and Bzevanis *Bioinformatics: A Practical Guide for Analysis of Gene and Proteins* (Wiley & Sons, Inc., 2nd ed., 2001). See U.S. Pat. No. 6,420,108.

The present invention may also make use of various computer program products and software for a variety of purposes, such as probe design, management of data, analysis, and instrument operation. See, U.S. Pat. Nos. 5,593,839, 5,795,716, 5,733,729, 5,974,164, 6,066,454, 6,090,555, 6,185,561, 6,188,783, 6,223,127, 6,229,911 and 6,308,170.

Additionally, the present invention may have preferred embodiments that include methods for providing genetic information over networks such as the Internet as shown in U.S. Ser. Nos. 10/197,621, 10/063,559 (United States Publication No. 20020183936), 10/065,856, 10/065,868, 10/328,818, 10/328,872, 10/423,403, and 60/482,389.

II. Definitions

An "array" is an intentionally created collection of molecules which can be prepared either synthetically or biosynthetically. The molecules in the array can be identical or different from each other. The array can assume a variety of formats, e.g., libraries of soluble molecules; libraries of compounds tethered to resin beads, silica chips, or other solid supports.

Nucleic acid library or array is an intentionally created collection of nucleic acids which can be prepared either synthetically or biosynthetically and screened for biological activity in a variety of different formats (e.g., libraries of soluble molecules; and libraries of oligos tethered to resin beads, silica chips, or other solid supports). Additionally, the term "array" is meant to include those libraries of nucleic acids which can be prepared by spotting nucleic acids of essentially any length (e.g., from 1 to about 1000 nucleotide monomers in length) onto a substrate. The term "nucleic acid" as used herein refers to a polymeric form of nucleotides of any length, either ribonucleotides, deoxyribonucleotides or peptide nucleic acids (PNAs), that comprise purine and pyrimidine bases, or other natural, chemically or biochemically modified, non-natural, or derivatized nucleotide bases. The backbone of the polynucleotide can comprise sugars and phosphate groups, as may typically be found in RNA or DNA, or modified or substituted sugar or phosphate groups. A polynucleotide may comprise modified nucleotides, such as methylated nucleotides and nucleotide analogs. The sequence of nucleotides may be interrupted by non-nucleotide components. Thus the terms nucleoside, nucleotide, deoxynucleoside and deoxynucleotide generally include analogs such as those described herein. These analogs are those molecules having some structural features in common with a naturally occurring nucleoside or nucleotide such that when incorporated into a nucleic acid or oligonucleoside sequence, they allow hybridization with a naturally occurring nucleic acid sequence in solution. Typically, these analogs are derived from naturally occurring nucleosides and nucleotides by replacing and/or modifying the base, the ribose or the phosphodiester moiety. The changes can be tailor made to stabilize or destabilize hybrid formation or enhance the specificity of hybridization with a complementary nucleic acid sequence as desired.

Biopolymer or biological polymer: is intended to mean repeating units of biological or chemical moieties. Representative biopolymers include, but are not limited to, nucleic acids, oligonucleotides, amino acids, proteins, peptides, hormones, oligosaccharides, lipids, glycolipids, lipopolysaccharides, phospholipids, synthetic analogues of the foregoing, including, but not limited to, inverted nucleotides, peptide nucleic acids, Meta-DNA, and combinations of the above. "Biopolymer synthesis" is intended to encompass the synthetic production, both organic and inorganic, of a biopolymer.

Related to a bioploymer is a "biomonomer" which is intended to mean a single unit of biopolymer, or a single unit which is not part of a biopolymer. Thus, for example, a nucleotide is a biomonomer within an oligonucleotide biopolymer, and an amino acid is a biomonomer within a protein or peptide biopolymer; avidin, biotin, antibodies, antibody fragments, etc., for example, are also biomonomers. initiation Biomonomer: or "initiator biomonomer" is meant to indicate the first biomonomer which is covalently attached via reactive nucleophiles to the surface of the polymer, or the first biomonomer which is attached to a linker or spacer arm attached to the polymer, the linker or spacer arm being attached to the polymer via reactive nucleophiles.

Complementary: Refers to the hybridization or base pairing between nucleotides or nucleic acids, such as, for instance, between the two strands of a double stranded DNA molecule or between an oligonucleotide primer and a primer binding site on a single stranded nucleic acid to be sequenced or amplified. Complementary nucleotides are, generally, A and T (or A and U), or C and G. Two single stranded RNA or DNA molecules are said to be complementary when the nucleotides of one strand, optimally aligned and compared and with appropriate nucleotide insertions or deletions, pair with at least about 80% of the nucleotides of the other strand, usually at least about 90% to 95%, and more preferably from about 98 to 100%. Alternatively, complementarity exists when an RNA or DNA strand will hybridize under selective hybridization conditions to its complement. Typically, selective hybridization will occur when there is at least about 65% complementary over a stretch of at least 14 to 25 nucleotides, preferably at least about 75%, more preferably at least about 90% complementary. See, M. Kanehisa *Nucleic Acids Res.* 12:203 (1984), incorporated herein by reference.

Combinatorial Synthesis Strategy: A combinatorial synthesis strategy is an ordered strategy for parallel synthesis of diverse polymer sequences by sequential addition of reagents which may be represented by a reactant matrix and a switch matrix, the product of which is a product matrix. A reactant matrix is a 1 column by m row matrix of the building blocks to be added. The switch matrix is all or a subset of the binary numbers, preferably ordered, between 1 and m arranged in columns. A "binary strategy" is one in which at least two successive steps illuminate a portion, often half, of a region of interest on the substrate. In a binary synthesis strategy, all possible compounds which can be formed from an ordered set of reactants are formed. In most preferred embodiments, binary synthesis refers to a synthesis strategy which also factors a previous addition step. For example, a strategy in which a switch matrix for a masking strategy halves regions that were previously illuminated, illuminating about half of the previously illuminated region and protecting the remaining half (while also protecting about half of previously protected regions and illuminating about half of previously protected regions). It will be recognized that binary rounds may be interspersed with non-binary rounds and that only a portion of a substrate may be subjected to a binary scheme. A combinatorial "masking" strategy is a synthesis which uses light or other spatially selective deprotecting or activating agents to remove protecting groups from materials for addition of other materials such as amino acids.

Effective amount refers to an amount sufficient to induce a desired result.

Genome is all the genetic material in the chromosomes of an organism. DNA derived from the genetic material in the chromosomes of a particular organism is genomic DNA.

A genomic library is a collection of clones made from a set of randomly generated overlapping DNA fragments representing the entire genome of an organism. Hybridization conditions will typically include salt concentrations of less than about 1M, more usually less than about 500 mM and preferably less than about 200 mM. Hybridization temperatures can be as low as 5.degree. C., but are typically greater than 22.degree. C., more typically greater than about 30.degree. C., and preferably in excess of about 37.degree. C. Longer fragments may require higher hybridization temperatures for specific hybridization. As other factors may affect the stringency of hybridization, including base composition and length of the complementary strands, presence of organic solvents and extent of base mismatching, the combination of parameters is more important than the absolute measure of any one alone.

Hybridizations, e.g., allele-specific probe hybridizations, are generally performed under stringent conditions. For example, conditions where the salt concentration is no more than about 1 Molar (M) and a temperature of at least 25 degrees Celsius (° C.), e.g., 750 mM NaCl, 50 mM NaPhosphate, 5 mM EDTA, pH 7.4 (5×SSPE) and a temperature of from about 25 to about 30° C.

Hybridizations are usually performed under stringent conditions, for example, at a salt concentration of no more than 1 M and a temperature of at least 25° C. For example, conditions of 5×SSPE (750 mM NaCl, 50 mM NaPhosphate, 5 mM EDTA, pH 7.4) and a temperature of 25-30° C. are suitable for allele-specific probe hybridizations. For stringent conditions, see, for example, Sambrook, Fritsche and Maniatis. "*Molecular Cloning A laboratory Manual*" 2nd Ed. Cold Spring Harbor Press (1989) which is hereby incorporated by reference in its entirety for all purposes above.

The term "hybridization" refers to the process in which two single-stranded polynucleotides bind non-covalently to form a stable double-stranded polynucleotide; triple-stranded hybridization is also theoretically possible. The resulting (usually) double-stranded polynucleotide is a "hybrid." The proportion of the population of polynucleotides that forms stable hybrids is referred to herein as the "degree of hybridization."

Hybridization probes are oligonucleotides capable of binding in a base-specific manner to a complementary strand of nucleic acid. Such probes include peptide nucleic acids, as described in Nielsen et al., *Science* 254, 1497-1500 (1991), and other nucleic acid analogs and nucleic acid mimetics.

Hybridizing specifically to: refers to the binding, duplexing, or hybridizing of a molecule only to a particular nucleotide sequence or sequences under stringent conditions when that sequence is present in a complex mixture (e.g., total cellular) DNA or RNA.

Isolated nucleic acid is an object species invention that is the predominant species present (i.e., on a molar basis it is more abundant than any other individual species in the composition). Preferably, an isolated nucleic acid comprises at least about 50, 80 or 90% (on a molar basis) of all macromolecular species present. Most preferably, the object species is purified to essential homogeneity (contaminant species cannot be detected in the composition by conventional detection methods).

Ligand: A ligand is a molecule that is recognized by a particular receptor. The agent bound by or reacting with a receptor is called a "ligand," a term which is definitionally meaningful only in terms of its counterpart receptor. The term "ligand" does not imply any particular molecular size or other structural or compositional feature other than that the substance in question is capable of binding or otherwise interacting with the receptor. Also, a ligand may serve either as the natural ligand to which the receptor binds, or as a functional analogue that may act as an agonist or antagonist. Examples of ligands that can be investigated by this invention include, but are not restricted to, agonists and antagonists for cell membrane receptors, toxins and venoms, viral epitopes, hormones (e.g., opiates, steroids, etc.), hormone receptors, peptides, enzymes, enzyme substrates, substrate analogs, transition state analogs, cofactors, drugs, proteins, and antibodies. Linkage disequilibrium or allelic association means the preferential association of a particular allele or genetic marker with a specific allele, or genetic marker at a nearby chromosomal location more frequently than expected by chance for any particular allele frequency in the population. For example, if locus X has alleles a and b, which occur equally frequently, and linked locus Y has alleles c and d, which occur equally frequently, one would expect the combination ac to occur with a frequency of 0.25. If ac occurs more frequently, then alleles a and c are in linkage disequilibrium. Linkage disequilibrium may result from natural selection of certain combination of alleles or because an allele has been introduced into a population too recently to have reached equilibrium with linked alleles.

Mixed population or complex population: refers to any sample containing both desired and undesired nucleic acids. As a non-limiting example, a complex population of nucleic acids may be total genomic DNA, total genomic RNA or a combination thereof. Moreover, a complex population of nucleic acids may have been enriched for a given population but include other undesirable populations. For example, a complex population of nucleic acids may be a sample which has been enriched for desired messenger RNA (mRNA) sequences but still includes some undesired ribosomal RNA sequences (rRNA).

Monomer: refers to any member of the set of molecules that can be joined together to form an oligomer or polymer. The set of monomers useful in the present invention includes, but is not restricted to, for the example of (poly)peptide synthesis, the set of L-amino acids, D-amino acids, or synthetic amino acids. As used herein, "monomer" refers to any member of a basis set for synthesis of an oligomer. For example, dimers of L-amino acids form a basis set of 400 "monomers" for synthesis of polypeptides. Different basis sets of monomers may be used at successive steps in the synthesis of a polymer.

The term "monomer" also refers to a chemical subunit that can be combined with a different chemical subunit to form a compound larger than either subunit alone. mRNA or mRNA transcripts: as used herein, include, but not limited to pre-mRNA transcript(s), transcript processing intermediates, mature mRNA(s) ready for translation and transcripts of the gene or genes, or nucleic acids derived from the mRNA transcript(s). Transcript processing may include splicing, editing and degradation. As used herein, a nucleic acid derived from an mRNA transcript refers to a nucleic acid for whose synthesis the mRNA transcript or a subsequence thereof has ultimately served as a template. Thus, a cDNA reverse transcribed from an mRNA, an RNA transcribed from that cDNA, a DNA amplified from the cDNA, an RNA transcribed from the amplified DNA, etc., are all derived from the mRNA transcript and detection of such derived products is indicative of the presence and/or abundance of the original transcript in a sample. Thus, mRNA derived samples include, but are not limited to, mRNA transcripts of the gene or genes, cDNA reverse transcribed from the mRNA, cRNA transcribed from the cDNA, DNA amplified from the genes, RNA transcribed from amplified DNA, and the like.

Nucleic acid library or array is an intentionally created collection of nucleic acids which can be prepared either synthetically or biosynthetically and screened for biological activity in a variety of different formats (e.g., libraries of soluble molecules; and libraries of oligos tethered to resin beads, silica chips, or other solid supports). Additionally, the term "array" is meant to include those libraries of nucleic acids which can be prepared by spotting nucleic acids of essentially any length (e.g., from 1 to about 1000 nucleotide monomers in length) onto a substrate. The term "nucleic acid" as used herein refers to a polymeric form of nucleotides of any length, either ribonucleotides, deoxyribonucleotides or peptide nucleic acids (PNAs), that comprise purine and pyrimidine bases, or other natural, chemically or biochemically modified, non-natural, or derivatized nucleotide bases. The backbone of the polynucleotide can comprise sugars and phosphate groups, as may typically be found in RNA or DNA, or modified or substituted sugar or phosphate groups. A polynucleotide may comprise modified nucleotides, such as methylated nucleotides and nucleotide analogs. The sequence of nucleotides may be interrupted by non-nucleotide components. Thus the terms nucleoside, nucleotide, deoxynucleoside and deoxynucleotide generally include analogs such as those described herein. These analogs are those molecules having some structural features in common with a naturally occurring nucleoside or nucleotide such that when incorporated into a nucleic acid or oligonucleoside sequence, they allow hybridization with a naturally occurring nucleic acid sequence in solution. Typically, these analogs are derived from naturally occurring nucleosides and nucleotides by replacing and/or modifying the base, the ribose or the phosphodiester moiety. The changes can be tailor made to stabilize or destabilize hybrid formation or enhance the specificity of hybridization with a complementary nucleic acid sequence as desired.

Nucleic acids according to the present invention may include any polymer or oligomer of pyrimidine and purine bases, preferably cytosine, thymine, and uracil, and adenine and guanine, respectively. See Albert L. Lehninger, PRINCIPLES OF BIOCHEMISTRY, at 793-800 (Worth Pub. 1982). Indeed, the present invention contemplates any deoxyribonucleotide, ribonucleotide or peptide nucleic acid component, and any chemical variants thereof, such as methylated, hydroxymethylated or glucosylated forms of these bases, and the like. The polymers or oligomers may be heterogeneous or homogeneous in composition, and may be isolated from naturally-occurring sources or may be artificially or synthetically produced. In addition, the nucleic acids may be DNA or RNA, or a mixture thereof, and may exist permanently or transitionally in single-stranded or double-stranded form, including homoduplex, heteroduplex, and hybrid states.

An "oligonucleotide" or "polynucleotide" is a nucleic acid ranging from at least 2, preferable at least 8, and more preferably at least 20 nucleotides in length or a compound that specifically hybridizes to a polynucleotide. Polynucleotides of the present invention include sequences of deoxyribonucleic acid (DNA) or ribonucleic acid (RNA) which may be isolated from natural sources, recombinantly produced or artificially synthesized and mimetics thereof. A further example of a polynucleotide of the present invention may be peptide nucleic acid (PNA). The invention also encompasses situations in which there is a nontraditional base pairing such as Hoogsteen base pairing which has been identified in certain tRNA molecules and postulated to exist in a triple helix. "Polynucleotide" and "oligonucleotide" are used interchangeably in this application.

Probe: A probe is a surface-immobilized molecule that can be recognized by a particular target. See U.S. Pat. No. 6,582,908 for an example of arrays having all possible combinations of probes with 10, 12, and more bases. Examples of probes that can be investigated by this invention include, but are not restricted to, agonists and antagonists for cell membrane receptors, toxins and venoms, viral epitopes, hormones (e.g., opioid peptides, steroids, etc.), hormone receptors, peptides, enzymes, enzyme substrates, cofactors, drugs, lectins, sugars, oligonucleotides, nucleic acids, oligosaccharides, proteins, and monoclonal antibodies.

Primer is a single-stranded oligonucleotide capable of acting as a point of initiation for template-directed DNA synthesis under suitable conditions e.g., buffer and temperature, in the presence of four different nucleoside triphosphates and an agent for polymerization, such as, for example, DNA or RNA polymerase or reverse transcriptase. The length of the primer, in any given case, depends on, for example, the intended use of the primer, and generally ranges from 15 to 30 nucleotides. Short primer molecules generally require cooler temperatures to form sufficiently stable hybrid complexes with the template. A primer need not reflect the exact sequence of the template but must be sufficiently complementary to hybridize with such template. The primer site is the area of the template to which a primer hybridizes. The primer pair is a set of primers including a 5' upstream primer that hybridizes with the 5' end of the sequence to be amplified and a 3' downstream primer that hybridizes with the complement of the 3' end of the sequence to be amplified.

Polymorphism refers to the occurrence of two or more genetically determined alternative sequences or alleles in a population. A polymorphic marker or site is the locus at which divergence occurs. Preferred markers have at least two alleles, each occurring at frequency of greater than 1%, and more preferably greater than 10% or 20% of a selected population. A polymorphism may comprise one or more base changes, an insertion, a repeat, or a deletion. A polymorphic locus may be as small as one base pair. Polymorphic markers include restriction fragment length polymorphisms, variable number of tandem repeats (VNTR's), hypervariable regions, minisatellites, dinucleotide repeats, trinucleotide repeats, tetranucleotide repeats, simple sequence repeats, and insertion elements such as Alu. The first identified allelic form is arbitrarily designated as the reference form and other allelic forms are designated as alternative or variant alleles. The allelic form occurring most frequently in a selected population is sometimes referred to as the wildtype form. Diploid organisms may be homozygous or heterozygous for allelic forms. A diallelic polymorphism has two forms. A triallelic polymorphism has three forms. Single nucleotide polymorphisms (SNPs) are included in polymorphisms.

Receptor: A molecule that has an affinity for a given ligand. Receptors may be naturally-occurring or manmade molecules. Also, they can be employed in their unaltered state or as aggregates with other species. Receptors may be attached, covalently or noncovalently, to a binding member, either directly or via a specific binding substance. Examples of receptors which can be employed by this invention include, but are not restricted to, antibodies, cell membrane receptors, monoclonal antibodies and antisera reactive with specific antigenic determinants (such as on viruses, cells or other materials), drugs, polynucleotides, nucleic acids, peptides, cofactors, lectins, sugars, polysaccharides, cells, cellular membranes, and organelles. Receptors are sometimes referred to in the art as anti-ligands. As the term receptors is used herein, no difference in meaning is intended. A "Ligand Receptor Pair" is formed when two macromolecules have combined through molecular recognition to form a complex. Other examples of receptors which can be investigated by this invention include but are not restricted to those molecules shown in U.S. Pat. No. 5,143,854, which is hereby incorporated by reference in its entirety.

"Solid support", "support", and "substrate" are used interchangeably and refer to a material or group of materials having a rigid or semi-rigid surface or surfaces. In many embodiments, at least one surface of the solid support will be substantially flat, although in some embodiments it may be desirable to physically separate synthesis regions for different compounds with, for example, wells, raised regions, pins, etched trenches, or the like. According to other embodiments, the solid support(s) will take the form of beads, resins, gels, microspheres, or other geometric configurations. See U.S. Pat. No. 5,744,305 for exemplary substrates.

Target: A molecule that has an affinity for a given probe. Targets may be naturally occurring or man-made molecules. Also, they can be employed in their unaltered state or as aggregates with other species. Targets may be attached, covalently or noncovalently, to a binding member, either directly or via a specific binding substance. Examples of targets which can be employed by this invention include, but are not restricted to, antibodies, cell membrane receptors, monoclonal antibodies and antisera reactive with specific antigenic determinants (such as on viruses, cells or other materials), drugs, oligonucleotides, nucleic acids, peptides, cofactors, lectins, sugars, polysaccharides, cells, cellular membranes, and organelles. Targets are sometimes referred to in the art as anti-probes. As the term targets is used herein, no difference in meaning is intended. A "Probe Target Pair" is formed when two macromolecules have combined through molecular recognition to form a complex.

WGSA (Whole Genome Sampling Assay) Genotyping Technology: A technology that allows the genotyping of hundreds of thousands of SNPS simultaneously in complex DNA without the use of locus-specific primers. In this technique, genomic DNA, for example, is digested with a restriction enzyme of interest and adaptors are ligated to the digested fragments. A single primer corresponding to the adaptor sequence is used to amplify fragments of a desired size, for example, 500-2000 bp. The processed target is then hybridized to nucleic acid arrays comprising SNP-containing fragments/probes. WGSA is disclosed in, for example, U.S. Provisional Application Ser. Nos. 60/319,685; 60/453,930, 60/454,090 and 60/456,206, 60/470,475, U.S. patent application Ser. Nos. 09/766,212, 10/316,517, 10/316,629, 10/463,991, 10/321,741, 10/442,021 and 10/264,945, each of which is hereby incorporated by reference in its entirety for all purposes.

Whole Transcript Assay (WTA): is used herein, a WTA is an assay protocol that can representatively sample entire transcripts (i.e., all exons in a transcript). WTA is disclosed in, for example, U.S. Provisional Application Ser. Nos. 60/683,127 and U.S. patent application Ser. Nos. 11/419,459, each of which is hereby incorporated by reference in its entirety for all purposes.

Reference will now be made in detail to exemplary embodiments of the invention. While the invention will be described in conjunction with the exemplary embodiments, it will be understood that they are not intended to limit the invention to these embodiments. On the contrary, the invention is intended to cover alternatives, modification and equivalents, which may be included within the spirit and scope of the invention.

III. Specific Embodiments

Some embodiments of the present invention provide systems and methods for using embossing techniques to make microfluidic devices, such as lab cards. In one aspect of the present invention, systems, methods, and computer software products are provided for using embossing techniques for making lab cards related to biological assays. Merely by way of example, the invention is described as it applies to making lab cards for preparing nucleic acid samples for hybridization with microarrays, but it should be recognized that the invention has a broader range of applicability.

In other aspect of the invention, methods, devices, systems and computer software products for automated biological assay and/or reduce reagent volume are provided. For example, the biological assay is related to sample preparation which is provided with respect to illustrative, non-limiting, implementations. Various alternatives, modifications and equivalents are possible. Some embodiments of the present invention are systems and methods for controlling lab cards, such as microfluidic lab cards. In another aspect of the present invention, the lab cards are suitable for performing complex chemical and/or biochemical reactions. They are particularly suitable for performing the WGSA assay as an example, however, they are not limited to such uses.

For example, certain systems, methods, and computer software products are described herein using exemplary implementations for analyzing data from arrays of biological materials such as, for instance, Affymetrix® GeneChip® probe arrays. However, these systems, methods, and products may be applied with respect to many other types of probe arrays and, more generally, with respect to numerous parallel biological assays produced in accordance with other conventional technologies and/or produced in accordance with techniques that may be developed in the future. For example, the systems, methods, and products described herein may be applied to parallel assays of nucleic acids, PCR products generated from cDNA clones, proteins, antibodies, or many other biological materials. These materials may be disposed on slides (as typically used for spotted arrays), on substrates employed for GeneChip® arrays, or on beads, bead arrays, optical fibers, or other substrates or media, which may include polymeric coatings or other layers on top of slides or other substrates. Moreover, the probes need not be immobilized in or on a substrate, and, if immobilized, need not be disposed in regular patterns or arrays. For convenience, the term "probe array" will generally be used broadly hereafter to refer to all of these types of arrays and parallel biological assays. Certain embodiments of the present invention are described in the simplified figures of this application.

IV. Microfluidic Features

The device of the present invention is generally capable of carrying out a number of preparative and analytical reactions on a number of samples. In a preferred embodiment, to achieve this end, the device generally comprises a number of inlet channels, a common channel and a set of control valves within a single unit, body or system.

According to one aspect of the present invention, a system for introducing multiple samples and performing multiple reactions and steps is provided as shown in FIG. 1*a*. This diagram is merely an example, which should not unduly limit the scope of the claims. One of ordinary skill in the art would recognize many variations, alternatives, and modifications. This adjustable microfluidic splitting structure is used to deliver various volumes of liquids into a number of sample chambers. This system includes a housing that comprises a liquid cavity that is made up of a plurality of inlet channels that are fluidly connected at a common channel. A liquid is introduced into the inlet of an inlet channel. In a preferred embodiment, the valves are controllable such that the valves are activated to divide the liquid into a plurality of measuremetric channels and provide a desired volume of liquid. This system as mentioned earlier can be utilized in various applications. Specific volumes of multiple of liquids may be processed to provide a multiple number of samples. In one preferred embodiment, the liquid contains at least one target molecule.

Typically, the body of the device defines the various inlet channels, common channel(s) and measuremetric channels in which the above described operations are carried out according to certain embodiments of the present invention. Fabrication of the body and thus the various channels and chambers disposed within the body may generally be carried out using one or a combination of a variety of well known manufacturing techniques and materials as described in U.S. Pat. Nos. 6,197,595 and 6,830,936. These references are incorporated herein by reference in its entirety. The body of the device is generally fabricated using one or more of a variety of methods and materials suitable for micro fabrication techniques such as embossing, injection molding, thermal bonding thermal forming, etc. Typical plastic materials used for microfluidics are thermal-plastics: polycarbonate, polymethyl methacrylate (PMMA), COC, etc. and elastomers: polydimethylsiloxane (PDMS). For example, in a preferred embodiment, the body of the device may be injected molded parts from Polycarbonate.

As shown in FIG. 1*a*, liquids (100*a* to *l*) are loaded into the system from the inlets of the inlet channels (101), which are the channels that are used to transfer the liquid from the inlet to the common channel (102). In general, the dimensions of the channels within the miniaturized device may be embodied in any number of shapes depending upon the particular need. Additionally, these dimensions will typically vary depending upon the number of liquids, the number of reactions performed and the number of samples and the like. Typically, the number of fluidic channels is equal to the number of reagents multiplied by the number of samples. In one aspect of the present invention, the number of fluidic channels is equal to the sum of the number of reagents and the number of samples. In a preferred embodiment, after the liquids are introduced, the liquids pass through one common channel (102). The liquid may split up into the various measuremetric channels (103). As discussed above, the channels may be of various dimensions, shapes and quantities. There may be a set (104) of individual valves (105) that control the fluid flow of the liquids into the specific channels. A different valve location(s) may correspond to different volume(s) for each measuremetric channel. A different channel may correspond to the same volume or a different volume for each valve. Controllable valves are provided to provide different volumes according to another embodiment of the present invention. Computer software products are provided to control various active components (i.e. the valves, or liquids, microfluidic system, etc.), temperature and measurement devices according to another embodiment of the present invention. The system may be conveniently controlled by any programmable device, preferably a digital computer such as a Dell personal computer. The computers typically have one or more central processing unit coupled with a memory. A display device such as a monitor is attached for displaying data and programming. A printer may also be attached. A computer readable medium such as a hard drive or a CD ROM can be attached. Program instructions for controlling the liquid handling may be stored on these devices.

Figure 1B:
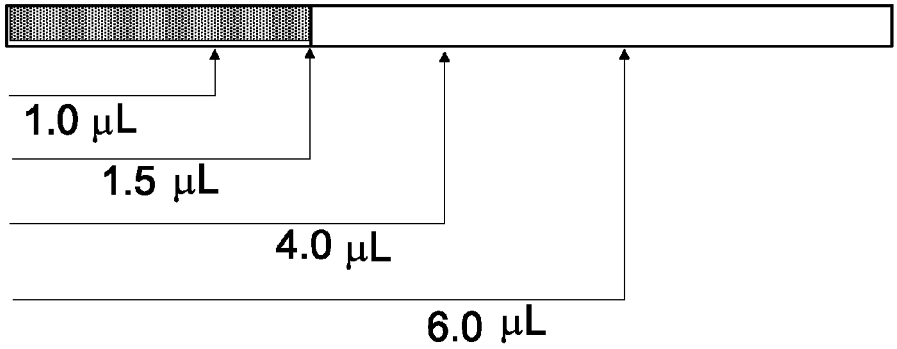

In another preferred embodiment, a measuremetric channel and a valve mechanism may be used to precisely measure fluid volumes for introduction into a subsequent sample chamber. In such cases, the location of the valve mechanism of the channel will be dictated by measuremetric needs of a given reaction. Furthermore, the measuremetric channel(s) may be fabricated to include a number of valve mechanisms to provide a number of volumes. In a preferred embodiment, the controllable valves will stop the liquid at a desired location to provide the desired volume. FIGS. 3-9 illustrate preferred embodiments of three valve mechanism designs. Combination of different valve locations can realize variant volume dispensing. FIG. 1*b* provides an example of various volumes that could be specified by the location of the valves. This diagram is merely an example, which should not unduly limit the scope of the claims. One of ordinary skill in the art would recognize many variations, alternatives, and modifications. In this example, valves 1-4 correspond to volumes of 1.0 μl, 1.5 μl, 4.0 μl and 6.0 μl respectively. As mentioned above, the number of valves will depend on several factors, for example, the size of the platform, the number of different volume requirements, etc. In general, the measuremetric channels will include volumes from about 0.05 μl to about 20 μl in volume, preferably from about 1.0 μl to 10 μl. The desired volume of liquid may be provided by activating the valves (105) and gates (106) of the channels. There can be a number of sets (104) of valves depending on the volume requirements of the liquids to produce the samples (107) in the corresponding sample chambers.

According to an embodiment of the present invention, an apparatus for providing a plurality of predetermined volumes of liquids is illustrated in FIGS. 1*a* and 1*b*. In this example, predetermined volumes of liquids a-l (100) are delivered to chambers with different samples (S1 to S4). The apparatus includes a first plurality of channels and each of the first plurality of channels is capable of holding a volume of a liquid. A second plurality of channels is directly or indirectly connected to the first plurality of channels. The second plurality of channels is coupled to a plurality of valves and each of the second plurality of channels includes a plurality of channel segments. A first segment of the plurality of channel segments is connected to a second segment of the plurality of channel segments if at least one of the plurality of valves is closed. The first segment of the plurality of channel segments is disconnected from the second segment of the plurality of channel segments if the at least one of the plurality of valves is open.

Figure 2:
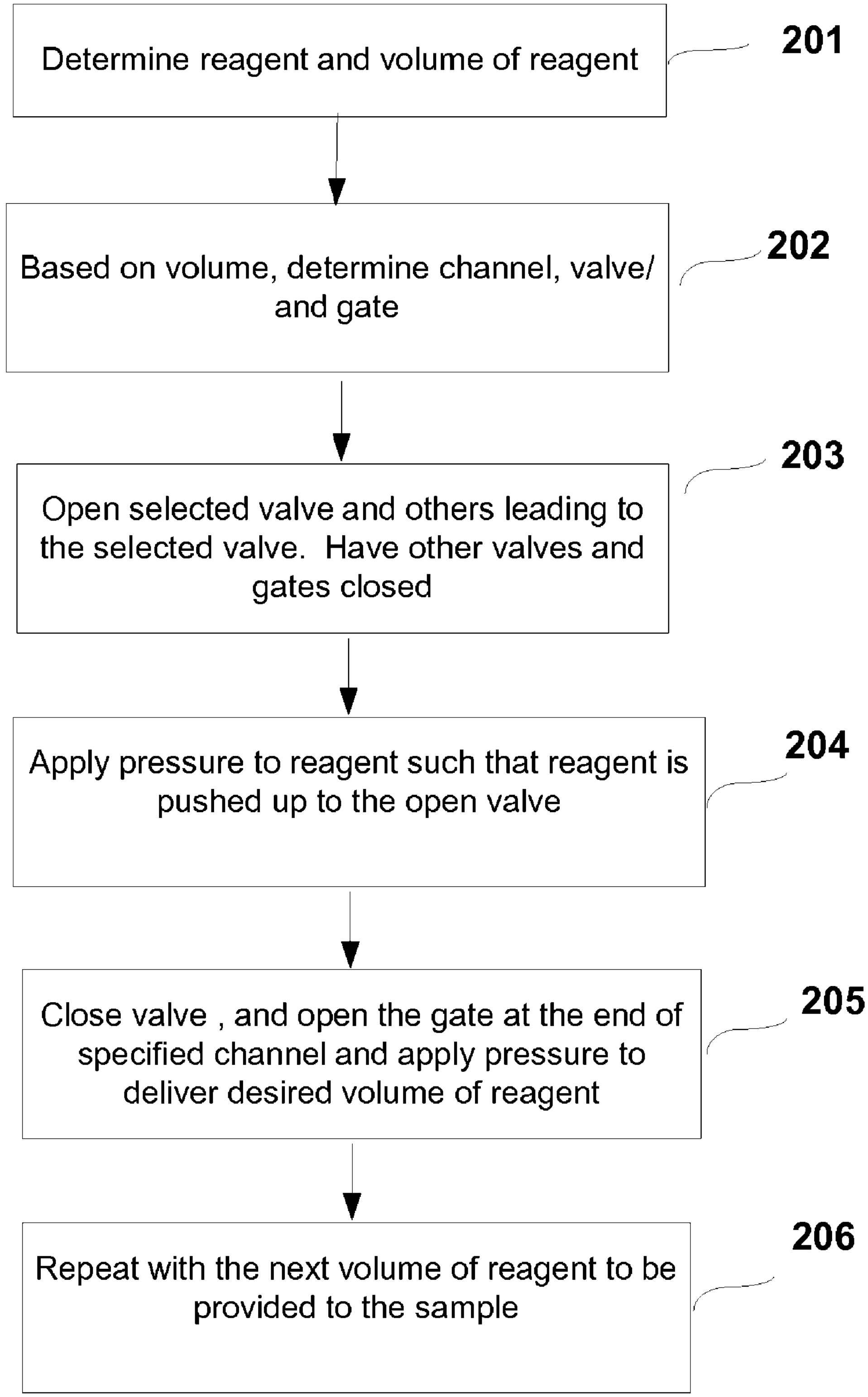
FIG. 2 illustrates an outline showing the steps to provide a desired volume of liquid into a sample chamber according to an embodiment of the present invention.

According to one aspect of the present invention, FIG. 2 illustrates an outline showing the steps to provide a desired volume of liquid (100) into, for example, a sample chamber (107). This diagram is merely an example, which should not unduly limit the scope of the claims. One of ordinary skill in the art would recognize many variations, alternatives, and modifications. The first step (process 201) is to determine the volume of liquid (100) required for a reaction. At the next step (process 202), is to determine which channels, valves and gate are to be used based on the determined volume from the first step. The selected valve and the others leading the selected valve are opened while keeping the other valves and gates closed at the following step (process 203). Next (process 204), pressure is applied to the liquid such that liquid is pushed up to the open valve. At the following step (process 205), the valve is closed and the gate at the end of the specified channel is opened once the liquid reaches the desired destination. Air or gas pressure is further applied to deliver the desired volume of liquid. At the final step (process 206), the steps (e.g., processes 201-205) are repeated to deliver the next volume of liquid to the sample.

In a preferred embodiment, a liquid is provided to all the samples in the various chambers in the same or different volumes. The smallest volume required of any of the liquids may be indicated by the first valve. When the pressure is applied, the pressure can be applied equally such that volume of liquid is equally split between the channels. This process may be accomplished based on the design of the valve mechanism, the operation of the microfluidics and the characteristics of the liquid.

According to yet another embodiment, a method for providing a plurality of predetermined volumes of a liquid includes providing a volume of a liquid to a channel. The channel is directly or indirectly connected to a plurality of channels. The plurality of channels is coupled to a plurality of valve and each of the plurality of channels includes a plurality of channel segments. A first segment of the plurality of channel segments is capable of being connected to or disconnected from a second segment of the plurality of channel segments in response to at least one of the plurality of valves. Additionally, the method includes receiving information associated with a plurality of predetermined volumes for a liquid corresponding to the plurality of channels respectively, and processing information associated with the plurality of predetermined volumes for the liquid. Moreover, the method includes selecting one valve from a plurality of valves based on at least one information associated with the plurality of predetermined volumes, opening the selected valve, and transporting the liquid through the plurality of channels up to the opened valve. In another example, the method also includes closing the selected valve after transporting the liquid through the plurality of channels up to the opened valve. The process for closing the selected valve is performed so that the liquid flows in the plurality of channels and the plurality of channels holds the plurality of predetermined volumes of the liquid respectively. In yet another example, the process for transporting the liquid through the plurality of channels up to the opened valve includes applying a pressure to the liquid in the channel.

Figure 3:
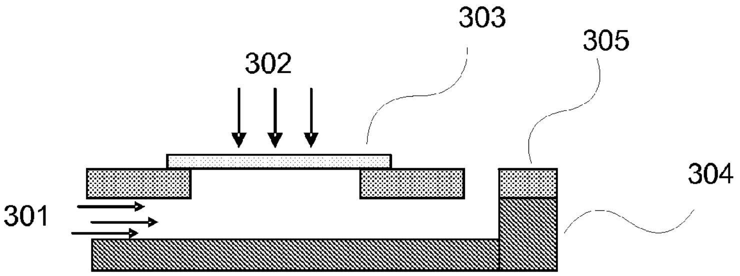
FIG. 3 illustrates a valve mechanism design which has an air driven flexible membrane valve according to an embodiment of the present invention.
Figure 5:
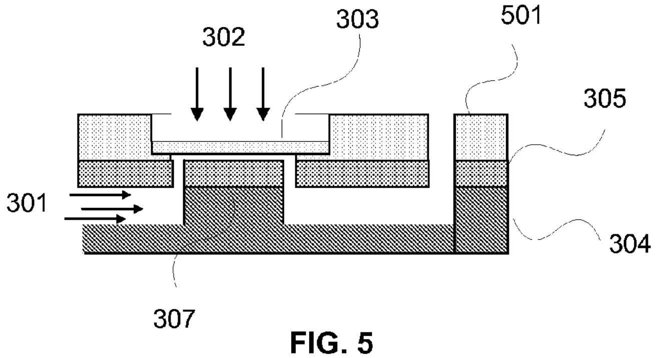
FIG. 5 illustrates an alternative embodiment of a valve mechanism design, a 3-layer flexible membrane valve.

FIGS. 3, 5 and 7 illustrate valve mechanism designs: a valve design with an air driven flexible membrane, a 3-layer flexible membrane valve design, and a valve design utilizing a gas permeable fluid barrier respectively according to some embodiments of the present invention. These diagrams are merely examples, which should not unduly limit the scope of the claims. One of ordinary skill in the art would recognize many variations, alternatives, and modifications. FIG. 3 illustrates an alternative embodiment of a valve mechanism design which has an air driven flexible membrane valve. The air driven flexible membrane valve design is simple such that it is made up of a channel formed by plastic (304 and 305) and a flexible membrane. The flexible membrane may be composed of any material that will be able to function as described in this application. In a preferred embodiment, the flexible membrane is a polydimethylsiloxane (PDMS) membrane (303).

Figure 4A:
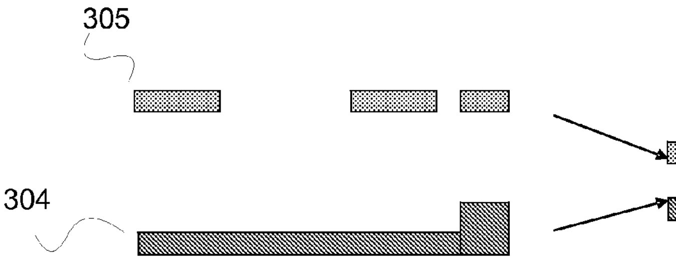
FIGS. 4*a*-4*d* illustrate a method for making and using a valve mechanism with an air driven flexible membrane valve according to an embodiment of the present invention.
Figure 4B:
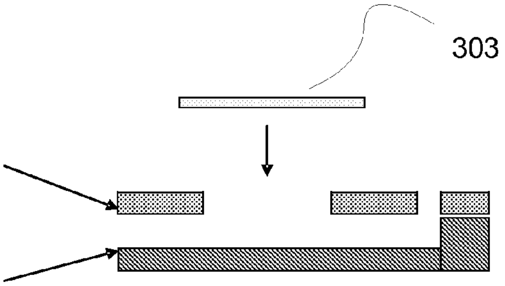
Figure 4C:
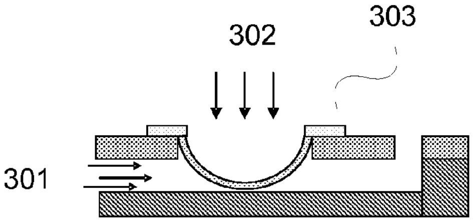
Figure 4D:
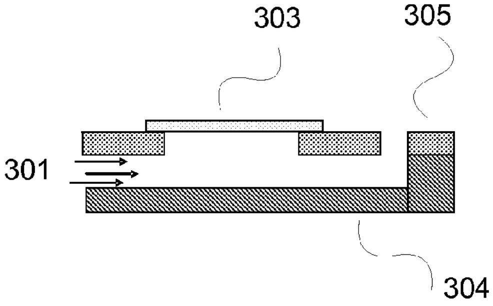

FIGS. 4*a*-4*d* illustrate a method for making and using a valve mechanism with an air driven flexible membrane valve according to an embodiment of the present invention. These diagrams are merely examples, which should not unduly limit the scope of the claims. One of ordinary skill in the art would recognize many variations, alternatives, and modifications. As shown in FIG. 4*a*, this design includes two layers of plastic (304 and 305) which are bonded together as shown in FIG. 4*b*. The flexible membrane (303) is then bonded to the second layer of plastic (305). In a preferred embodiment, the bonding is performed with an adhesive. The second layer of plastic (305) is preferably made out of a plastic that is compatible with the flexible membrane. Air pressure (301) is used to push the liquid through the channels, while the valve mechanism is used to control a volume of liquid by stopping the liquid at a desired location. As shown in FIG. 4*c*, the air or gas pressure (302) is used to activate the valve by pressing against the flexible membrane (303). The flexible membrane (303) protrudes into the channel or blocks the gate when the air pressure (302) pressing against the flexible membrane is greater than the air pressure (301) pushing the liquid. The air pressure (302) is turned off as shown in FIG. 4*d* to clear the gate.

Figure 6A:
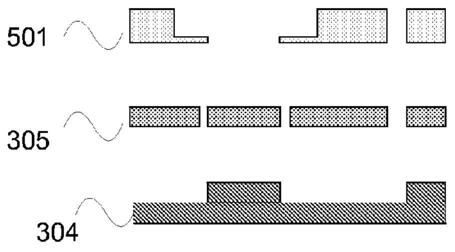
FIGS. 6*a*-6*d* illustrate a method for making and using a 3-layer flexible membrane valve mechanism according to an embodiment of the present invention.
Figure 6B:
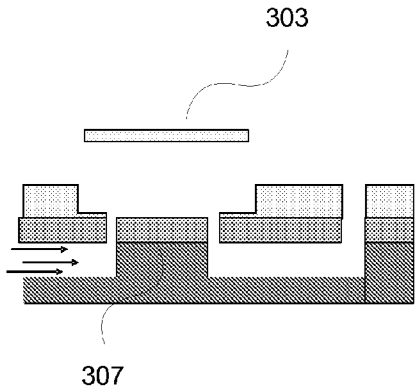
Figure 6C:
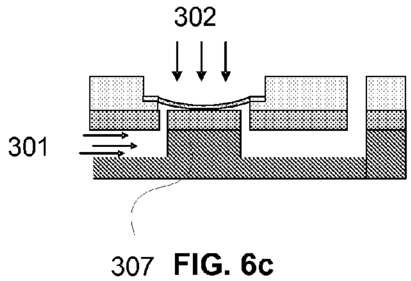
Figure 6D:
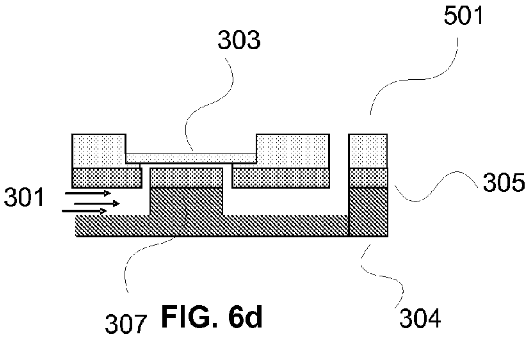

FIG. 5 illustrates a 3-layer flexible membrane valve mechanism according to another embodiment of the present invention. FIGS. 6*a*-6*d* illustrate a method for making and using a 3-layer flexible membrane valve mechanism according to an embodiment of the present invention. These diagrams are merely examples, which should not unduly limit the scope of the claims. One of ordinary skill in the art would recognize many variations, alternatives, and modifications. As shown in FIG. 6*a*, this design is composed of 3 layers: a plastic layer (304) to form the channels, a second layer of plastic (305) to be able to form a liquid tight seal against the flexible membrane (303), and a third layer of plastic (501) to support the flexible membrane (303) in place. The three plastic layers are bonded together as shown in FIG. 6*b*. In a preferred embodiment, as discussed above, the bonding is performed with an adhesive. A flexible membrane (303) as mentioned above is bonded to the third plastic layer as shown in FIG. 6*b*. This design introduces a protrusion feature (307) in the first plastic layer (304). A second layer of plastic is bonded to the first layer to form the protrusion feature (307). While the air pressure (301) is pushing the liquid through the channel, the air pressure (302) pushes the flexible membrane against the protrusion feature (307) as shown in FIG. 6*c* to stop the flow of liquid. Thus, the second layer is made out of a material that is compatible with the flexible membrane (303). The protrusion feature (307) may be of any shape, material such that when pressure is applied it stops the liquid from flowing. To clear the gate, the air pressure (302) is turned off as shown in FIG. 6*d*.

According to another embodiment of the present invention, a valve mechanism design utilizing a gas permeable fluid barrier is provided as shown in FIG. 7. In a preferred embodiment, this design includes a gas permeable fluid barrier (701) and a valve (105). The gas permeable fluid barrier is a barrier which permits the passage of gas without allowing for the passage of fluid. A variety of materials are suitable for use as a gas permeable fluid barrier including, e.g., porous hydrophobic polymer materials, such as spun fibers of acrylic, polycarbonate, teflon, pressed polypropylene fibers, or any number commercially available gas permeable fluid barrier (GE Osmonics labstore, Millipore, American Filtrona Corp., Gelman Sciences, and the like).

In a preferred embodiment, FIGS. 8*a*-8*d* illustrate a method for making and using a valve mechanism utilizing a gas permeable fluid barrier mechanism. These diagrams are merely examples, which should not unduly limit the scope of the claims. One of ordinary skill in the art would recognize many variations, alternatives, and modifications. As shown in FIG. 8*a*, this design is also composed of 3 layers: a plastic layer (304) to form the channels, a second layer of plastic (305) to be able to form a liquid tight seal against the gas permeable fluid barrier (701), and a third layer of plastic (501) to support the gas permeable fluid barrier (701) in place. The three plastic layers and the gas permeable fluid barrier (701) are assembled and bonded together as shown in FIG. 8*b*. In a preferred embodiment, as discussed above, the bonding is performed with an adhesive. A gas permeable fluid barrier (701) as mentioned above is bonded to the second plastic layer as shown in FIG. 8*b*. The air pressure (301) may push the liquid through the channel while the valve (105) is closed and the gate (106) is open as shown in FIG. 8*c*. The movement of the liquid is stopped when the valve (105) is closed and the gate (106) is opened as shown in FIG. 8*d*. In a preferred embodiment, the measuremetric channels and valve designs are such that the gas permeable fluid barrier is not contacted with the liquid.

Figure 9A:
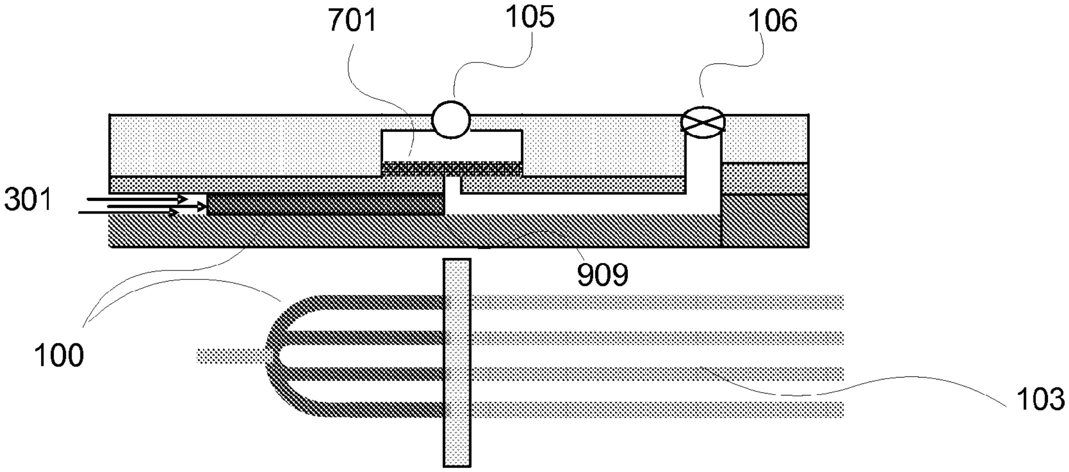
FIGS. 9*a*-9*b* illustrate the steps to operate a valve utilizing a gas permeable fluid barrier mechanism according to an embodiment of the present invention.
Figure 9B:
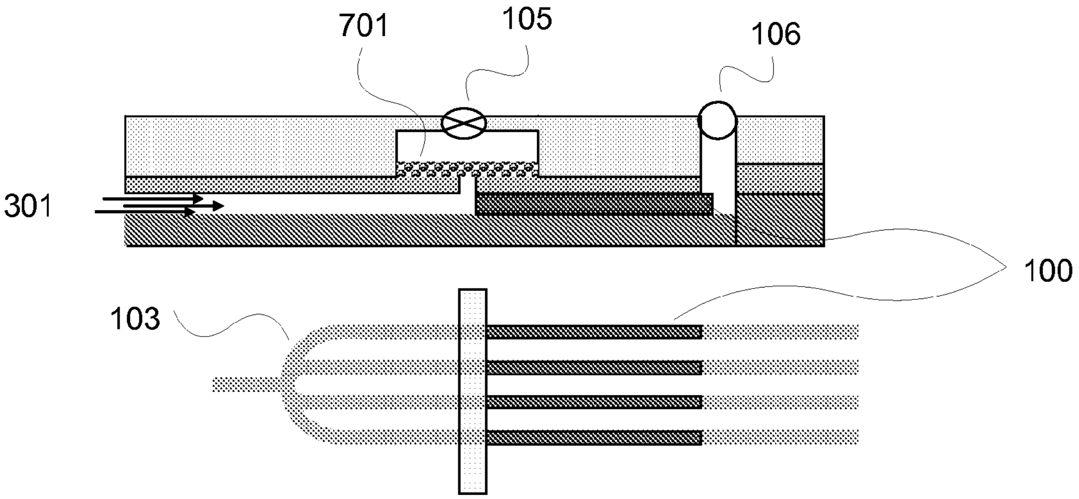

An illustration of another method, according to an embodiment of the present invention, of a valve mechanism utilizing a gas permeable fluid barrier is shown in FIGS. 9*a* and 9*b*. These diagrams are merely examples, which should not unduly limit the scope of the claims. One of ordinary skill in the art would recognize many variations, alternatives, and modifications. There can be several ways one may operate a system that is presented. In a preferred embodiment, multiple liquids can be added sequentially to various numbers of samples. Another example, is where a liquid can be added to various numbers of samples simultaneously according to an embodiment of the present invention. The air pressure (301) fills all the measuremetric channels (103) and pushes the liquid through the measuremetric channels (103) while the gates (106) are closed and the valves (105) are opened as illustrated in FIG. 9*a*. The introduced liquid displaces the gas that is present in the channel. The gas permeates through the gas permeable fluid barrier until the liquid (100) reaches the desired location (909). The liquid is held in place by utilizing surface tension. Then the gates (106) are opened and the valves (105) are closed as shown in FIG. 9*b*. The air pressure (301) pushes the liquid (100) through the measuremetric channels (103). In a preferred embodiment, the liquid can be prevented from being added to a sample by closing the corresponding gate (106) and valve (105) which will prevent the liquid from filling the specific measuremetric channel.

Figure 10:
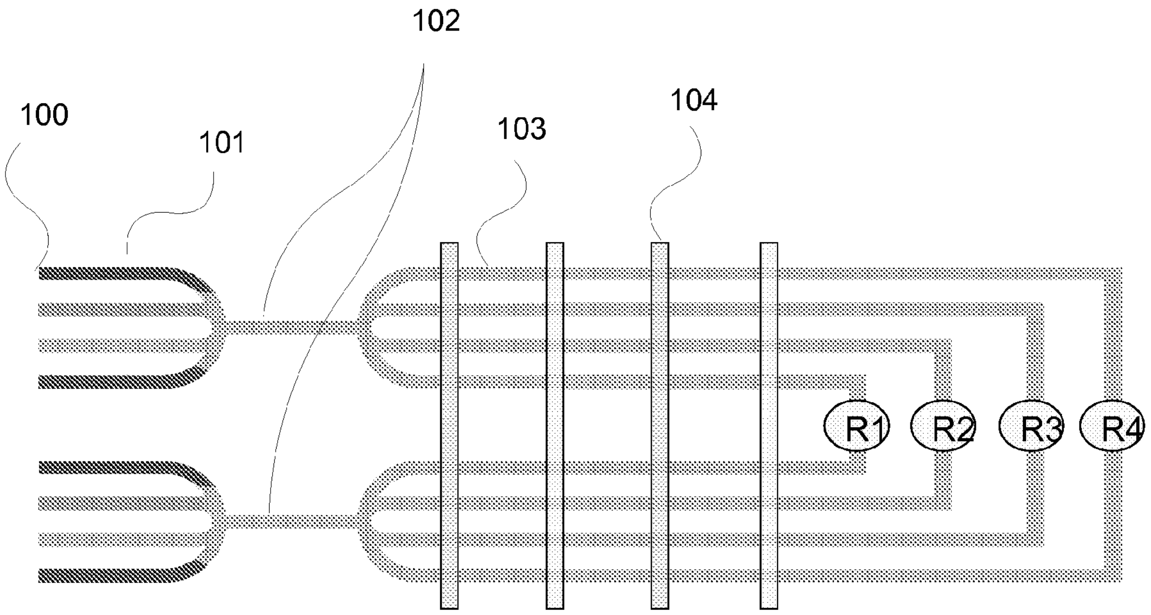
FIG. 10 illustrates an alternative embodiment of a system of channels and valves for introducing multiple samples and performing a number of reactions and steps.

In another preferred embodiment, a schematic of another system for introducing multiple samples and performing a number of reactions and steps is shown in FIG. 10. This diagram is merely an example, which should not unduly limit the scope of the claims. One of ordinary skill in the art would recognize many variations, alternatives, and modifications. In this system, there can be a number of liquids (100) and corresponding inlet channels (101). All the inlet channels (101) can be connected by a number of common channels (102). In this example there are two common channels (102) which separate into two sets of measuremetric channels that lead to corresponding sample chambers that perform a number of separate reactions. In this example, there are four reactions: R1, R2, R3, and R4 and four sets of valves (104). As discussed previously, the number of samples, reactions, sets of valves, etc. will depend on several factors such as the application.

In one aspect of the invention, a system for splitting a plurality of liquids comprising a housing which comprises a liquid cavity is provided. The liquid cavity comprises a plurality of inlet channels, at least one common channel, a plurality of measuremetric channels, a computer and a controlling device. The inlet channels comprise a plurality of inlets which are fluidly connected by at least one common channel. The common channel is fluidly linked to a number of measuremetric channels which comprise a set of valve mechanisms and gates. The pressure of a gas introduces the liquid into a measuremetric channel. A computer is used with the controlling device to control the valve mechanisms and gates such that the liquid is split into the plurality of measuremetric channels and the desired volume of liquid is produced. In a preferred embodiment, the housing is made of plastic. In another preferred embodiment, the liquid contains at least one target molecule.

In another preferred embodiment of the present invention, a system as described above is provided wherein the valve mechanism comprises a gas permeable fluid barrier, a valve and housing. The gas permeable fluid barrier comprises a first surface and a second surface, wherein the first surface is exposed to an air cavity. The valve permits air to flow out of the air cavity. The housing comprises a mounting surface, an air cavity, and a liquid cavity. The liquid cavity comprises an inlet port constructed to permit air flow into the air cavity through said inlet port. The second surface of the gas permeable fluid barrier is sealably mounted with respect to the mounting surface of the housing. The valve is used as the control unit either sealing the cavity or allowing the air to flow. In a preferred embodiment, the gas permeable fluid barrier is a hydrophobic membrane.

In one aspect of the present invention, an apparatus for controlling liquids is provided which comprises a gas permeable fluid barrier and a valve. The gas permeable fluid barrier comprises a first surface and a second surface, such that the first surface is exposed to an air cavity. The valve permits air to flow out of the air cavity. The housing comprises a mounting surface, the air cavity, and a liquid cavity. The liquid cavity comprises an inlet port constructed to permit air flow into said air cavity through said inlet port. The second surface of the gas permeable fluid barrier is sealably mounted with respect to the mounting surface of the housing whereby the valve is located inside the air cavity. In a preferred embodiment, the apparatus as described above is provided wherein the housing is made of plastic. In another preferred embodiment, the apparatus as described above is provided wherein the gas permeable fluid barrier is a hydrophobic membrane.

In another aspect of the present invention, a method for controlling liquids is provided which comprises providing a gas permeable fluid barrier which comprises a first surface and a second surface, the first surface exposed to an air cavity. The method then involves providing a valve, wherein the valve permits air to flow out of the air cavity, sealably mounting the second surface of the gas permeable fluid barrier to a housing which comprises a mounting surface, the air cavity, and a liquid cavity. The liquid cavity comprises an inlet port constructed to permit air flow into said air cavity through said inlet port, wherein the sealably mounting step assist in preventing a liquid to pass through the gas permeable fluid barrier. The method continues by controlling the valves to introduce the liquid inside the liquid cavity and stopping the liquid at a desired location. In a preferred embodiment, the method described above is provided wherein the housing is made of plastic. In another preferred embodiment, the method described is provided wherein the gas permeable fluid barrier is a hydrophobic membrane.

The inclusion of gas permeable fluid barriers, e.g., poorly wetting filter plugs or hydrophobic membranes, in these devices also permits a sensorless fluid direction and control system for moving fluids within the device. For example, such filter plugs, incorporated at the end of a reaction chamber opposite a fluid inlet will allow air or other gas present in the reaction chamber to be expelled during introduction of the fluid component into the chamber. Upon filling the chamber, the fluid sample will contact the hydrophobic plug thus stopping net fluid flow. Fluidic resistances, may also be employed as gas permeable fluid barriers, to accomplish this same result, e.g., using fluid passages that are sufficiently narrow as to provide an excessive fluid resistance, thereby effectively stopping or retarding fluid flow while permitting air or gas flow. Expelling the fluid from the chamber then involves applying a positive pressure at the plugged vent. This permits chambers which may be filled with no valves at the inlet, i.e., to control fluid flow into the chamber. In most aspects however, a single valve will be employed at the chamber inlet in order to ensure retention of the fluid sample within the chamber, or to provide a mechanism for directing a fluid sample to one chamber of a number of chambers connected to a common channel.

V. Lab Card

In a preferred embodiment of the present invention, the apparatus, method and system of the present invention is directed towards a hand held disposable device for performing a plurality of processes wherein the reagents are stored within the device according to an embodiment of the present invention. After performing the plurality of processes, the reacted solution is collected in a collection chamber and the generated waste is stored in a waste chamber within the hand held disposable device. According to a preferred embodiment of the present invention, the processing of reagents is directed by a gas and vacuum.

Typically, a device for performing a plurality of process can be referred to a microfluidic device, for example, as described in U.S. Pat. No. 6,168,948 which is incorporated herein in its entirety. In general, a lab card is a disposable part, for example, where reagents are stored, controlled and processed. A microfluidic device generally incorporates a lab card with the necessary instruments (for example, reusable components) required to control the fluidics and reaction conditions (for example, pressure regulator, valves, computers, mechanical hardware, heaters, coolers, etc).

The body of the lab card, in general, defines the various storage, reaction chambers and fluid passages or channels. According to an embodiment of the present invention, a lab card is fabricated with microfluidic features to incorporate a plurality of processes, for example, reagent delivery, storage, reaction, mixing, bubble removing, purification, drying, waste storage and the like. Fabrication of the body, and thus the various chambers and channels may generally be carried out using one or a combination of a variety of well known manufacturing techniques and materials. Generally, the material from which the body is fabricated will be selected so as to provide maximum resistance to the full range of conditions to which the device will be exposed, e.g., extremes of temperature, salt, pH, application of electric fields and the like, and will also be selected for compatibility with other materials used in the device. Additional components may be later introduced, as necessary, into the body. Alternatively, the device may be formed from a plurality of distinct parts that are later assembled or mated.

The body of the lab card is generally fabricated using one or more of a variety of methods and materials suitable for microfabrication techniques. For example, in preferred aspects, the body of the device may comprise a number of planar members that may individually be injection molded parts fabricated from a variety of polymeric materials, or may be silicon, glass, or the like. In the case of substrates like silica, glass or silicon, methods for etching, milling, drilling, etc., may be used to produce wells and depressions which make up the various reaction chambers and fluid channels within the device. Microfabrication techniques, such as those regularly used in the semiconductor and microelectronics industries are particularly suited to these materials and methods. These techniques include, e.g., electrodeposition, low-pressure vapor deposition, photolithography, wet chemical etching, reactive ion etching (RIE), laser drilling, and the like. Where these methods are used, it will generally be desirable to fabricate the planar members of the device from materials similar to those used in the semiconductor industry, i.e., silica, silicon, gallium arsenide, polyimide substrates. U.S. Pat. No. 5,252,294, to Kroy, et al., incorporated herein by reference in its entirety for all purposes, reports the fabrication of a silicon based multiwell apparatus for sample handling in biotechnology applications.

Some conventional techniques for plastic embossing often can only construct micro features that have certain aspect ratios, such as below 1. Usually, microfluidic structures each use a structure that has many through holes for inlets, outlets, and/or via connections. But certain conventional embossing techniques cannot provide through holes with high aspect ratios in embossed plastic slides. Subsequently, such holes often have to be drilled after embossing and hence cause several difficulties and/or disadvantages. For example, the multiple process steps requires extra time and costs. In anther example, it is often difficult to align the mechanical-drilled holes to the embossed micro features, thus causing chip-to-chip variations. In yet another example, contaminations during the drilling process, such as one performed in a machine shop, is often undesirable. In yet another example, the drilling process may generate debris, which can block or even damage the micro features. In yet another example, one or more extra cleaning processes may be needed. Thus, a one-step through hole embossing technique is highly desirable.

In a preferred embodiment of the present invention, the apparatus, method and system of the present invention is directed towards creating a hole with a high aspect ratio in a substrate which is used for example, as a channel. Typically, through holes in substrates is utilized in microfluidic systems such as, for example, lab cards or the microfluidic devices described in U.S. Pat. No. 6,168,948 which is incorporated herein in its entirety. In general, a lab card is a disposable part, for example, where reagents are stored, controlled and processed. A microfluidic device generally incorporates a lab card with all the necessary instruments (for example, reusable components) required to control the fluidics and reaction conditions (for example, pressure regulator, valves, computers, mechanical hardware, heaters, coolers, etc). The body of the lab card, in general, defines the various storage, reaction chambers and fluid passages or channels. Fabrication of the body, and thus the various chambers and channels may generally be carried out using one or a combination of a variety of well known manufacturing techniques and materials. Generally, the material from which the body is fabricated will be selected so as to provide maximum resistance to the full range of conditions to which the device will be exposed, e.g., extremes of temperature, salt, pH, application of electric fields and the like, and will also be selected for compatibility with other materials used in the device. Additional components may be later introduced, as necessary, into the body. Alternatively, the device may be formed from a plurality of distinct parts that are later assembled or mated.

The number, shape and size of the channels included within the device will also vary depending upon the specific application for which the device is to be used. The apparatus, method and system according to an embodiment of the present invention refers to a hole with a high aspect ratio wherein the aspect ratio is in the range of 1 to 20, preferably in the range of 1 to 50 and most preferably in the range of in the range of 1 to 100. In general, the holes corresponding to these high aspect ratios, in general, for example, typically range from about 10 to 5000 μm in depth, and from about 10 to 5000 μm in diameter, preferably about 50 to 1000 μm in depth and 100 to 1000 μm in diameter and most preferably about 100 to 1000 μm in depth and 100 to 500 μm in diameter. In this example, the hole is describe as a cylinder, defining the aspect ratio as the material thickness to the hole diameter. It is to be understood that the above description is intended to be illustrative and not restrictive. Many variations of the invention will be apparent to those of skill in the art upon reviewing the above description and figures. Such variation may include the shape which include those well known in the art, e.g., (i.e. the shape of the end of the hole, for example, being in the shape of a square, rectangle, circle, oval, star, free shape, pentagon, hexagon and the like). Thus, the corresponding aspect ratio is the depth to the smallest width of the hole. In addition, although described in terms of holes, it will be appreciated that these holes may perform a number of varied functions, e.g., as storage chambers/channels, incubation chambers/channels, mixing chambers/channels, and the like. According to preferred embodiment of the invention, the shape of the hole will correspond to the shape of the pin that penetrates through the substrate. As described above, in general, the hole is part of the lab card, therefore, it is usually fabricated directly onto the body of the microfluidic device. Although primarily described in terms of producing a fully integrated body of the device, the above described methods can also be used to fabricate individual discrete components of the device which are later assembled into the body of the device.

Photolithographic methods of etching substrates are particularly well suited for the microfabrication of these substrates and are well known in the art. For example, the first sheet of a substrate may be overlaid with a photoresist. An electromagnetic radiation source may then be shone through a photolithographic mask to expose the photoresist in a pattern which reflects the pattern of chambers and/or channels on the surface of the sheet. After removing the exposed photoresist, the exposed substrate may be etched to produce the desired wells and channels. Generally preferred photoresists include those used extensively in the semiconductor industry. Such materials include polymethyl methacrylate (PMMA) and its derivatives, and electron beam resists such as poly (olefin sulfones) and the like (more fully discussed in, e.g., Ghandi, "VLSI Fabrication Principles," Wiley (1983) Chapter 10, incorporated herein by reference in its entirety for all purposes).

As an example, the wells manufactured into the surface of one planar member make up the various reaction chambers of the device. Channels manufactured into the surface of this or another planar member make up fluid channels which are used to fluidly connect the various reaction chambers. Another planar member is then placed over and bonded to the first, whereby the wells in the first planar member define cavities within the body of the device which cavities are the various reaction chambers of the device. Similarly, fluid channels manufactured in the surface of one planar member, when covered with a second planar member define fluid passages through the body of the device. These planar members are bonded together or laminated to produce a fluid tight body of the device. Bonding of the planar members of the device may generally be carried out using a variety of methods known in the art and which may vary depending upon the materials used. For example, adhesives may generally be used to bond the planar members together. Where the planar members are, e.g., glass, silicon or combinations thereof, thermal bonding, anodic/electrostatic or silicon fusion bonding methods may be applied. For polymeric parts, a similar variety of methods may be employed in coupling substrate parts together, e.g., heat with pressure, solvent based bonding. Generally, acoustic welding techniques are generally preferred. In a related aspect, adhesive tapes may be employed as one portion of the device forming a thin wall of the reaction chamber/channel structures.

In additional embodiments, the body may comprise a combination of materials and manufacturing techniques described above. In some cases, the body may include some parts of injection molded plastics, and the like, while other portions of the body may comprise etched silica or silicon planar members, and the like. For example, injection molding techniques may be used to form a number of discrete cavities in a planar surface which define the various reaction chambers, whereas additional components, e.g., fluid channels, arrays, etc, may be fabricated on a planar glass, silica or silicon chip or substrate. Lamination of one set of parts to the other will then result in the formation of the various reaction chambers, interconnected by the appropriate fluid channels.

In one embodiment of the present invention, the body of the device in which the hole is made is from a material that has a glass transition temperature (Tg), for example, glasses and plastics. According to a preferred embodiment of the present invention, the material of the device is a thermoplastic. Examples of suitable polymers for embossing include, e.g., acrylic, polymethylmethacrylate (PMMA), thermoplastic polyimide, polyamide, cyclic olefin copolymer (COC), polyester, polycarbonate, polyetherimide, polyethylene (LDPE, HDPE, LLDPE), polypropylene, polysulfone, polyvinylchloride (PVC), polyrurethane, polystyrene, acrylonitrile-butadiene-styrene copolymer (ABS) plastic, and commercial polymers such as AUREM™, NYLON™, PEBAX™, LEXAN™, MAKROFOL™, CALIBRE™, HYTREL™, VALOX™, TEFLON™, DELRIN™, KALREZ™, VALOX™ and the like.

Another embodiment of the present invention utilizes equipment and processes that may heat, emboss and cool the substrate while in a planar condition to provide a large volume of constructed parts. One advantage of embossing the features into the substrate is that the stress relaxation problems associated with injection molded substrates are avoided. There is substantially better alignment of the polymer strands from the polymer material because the embossed substrates are not flowed or injected into a mold. Accordingly, there is substantially less relaxation of the overall substrate when the pins penetrate into the substrate during the embossing process. Therefore, there is substantially better alignment as a result of the significant reduction of channel deformation. The published article, J. Narasimhan et al., "Polymer Embossing Tools for Rapid Prototyping of Plastic Microfluidic Devices", Journal of Micromechanics and Microengineering, 14 (2004) 96-103), which is incorporated herein by reference for all purposes), describes an example of an embossing tool (MTP-10, Tetrahedron Associates Inc., San Diego, Calif.) and method used to created microchannels in a thermoplastic device.

An embodiment of the present invention provides devices, systems and methods for creating holes in lab cards, such as microfluidic lab cards for the example, sample preparation of biological assays. Merely by way of example, the invention is described as it applies to preparing nucleic acid samples for hybridization with microarrays, but it should be recognized that the invention has a broader range of applicability.

Figure 11A:
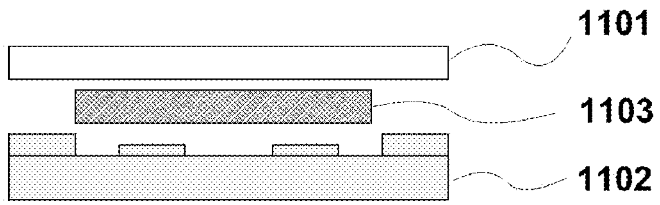
FIGS. 11*a-d* illustrate steps of a prior art method of creating a through hole in a substrate.
Figure 11B:
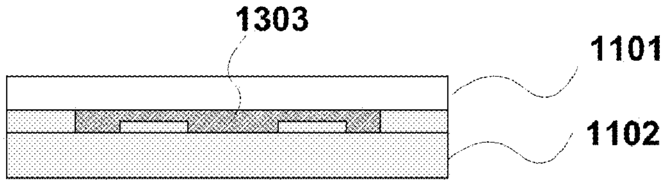
Figure 11C:
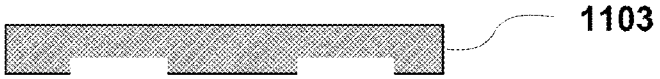
Figure 11D:
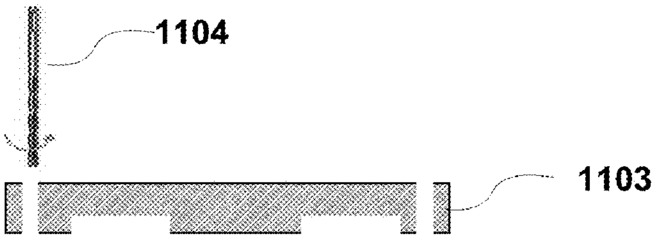

Certain embodiments of the present invention are described in simplified figures of the application. FIG. 11*a-d* illustrate steps of a prior art method of making a through hole in a microfluidic substrate using an embossing process. Typically, the substrate (1103) is placed in between a top plate (1101) and a bottom plate (1102) as shown in FIG. 11*a*. Usually the entire assembly is heated to the substrate softening temperature and the two plates are pressed together to mold the substrate to the impression of the desired molded microfluidic part that is provided by the plates as shown in FIG. 11*b*. The assembly unit is cooled and the molded substrate (1103) illustrated in FIG. 11*c* is produced. A drill (1104) is then used to construct a through hole in the substrate as shown in FIG. 11*d*.

Constructing the through hole using the method according to the present invention simplifies construction for the fabrication of internal channels and the like, and can also be made at a relatively low cost. In particularly preferred embodiments, at least one planar member or substrate of the body of the device is made from at least one embossed molded part that has one or more depressions manufactured into its surface to define a wall of a well, chamber, channel or through holes constructed by the method according to an embodiment of the present invention. The through holes can act as channels, or chambers and the like.

Figure 12A:
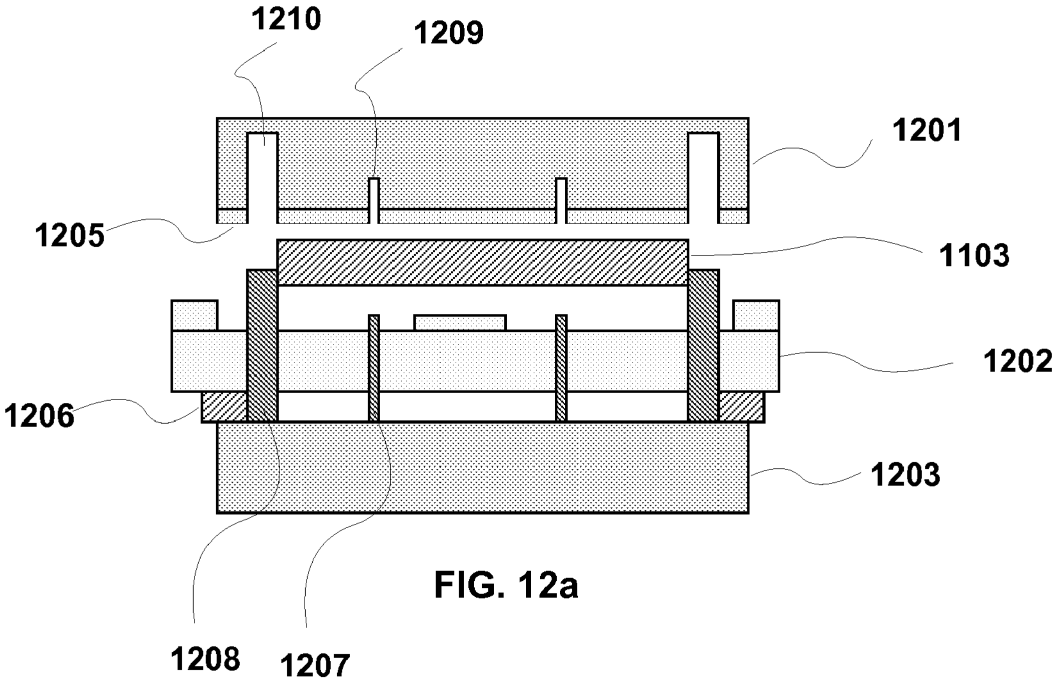
FIGS. 12*a-c* illustrate a method of creating a through hole in a substrate according to an embodiment of the present invention.
Figure 12B:
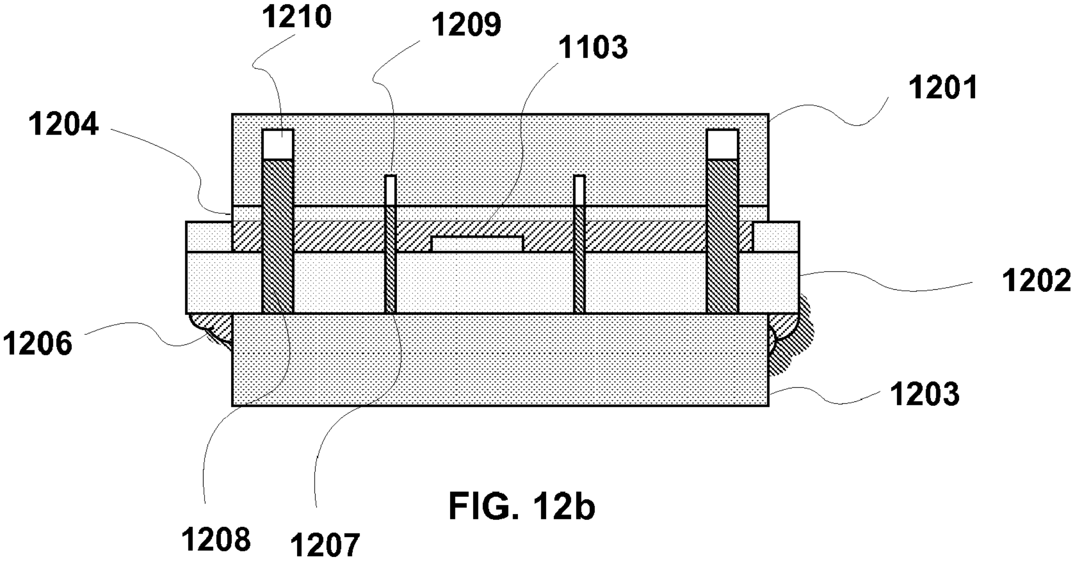
Figure 12C:

In a preferred embodiment of the present invention, an apparatus, method and system for constructing at least one hole in a substrate for a microfluidic device is provided. FIGS. 12*a-c* illustrate an embodiment of the present invention of a method of creating a through hole in a substrate. As shown in FIG. 12*a*, according to an embodiment of the present invention, a method is provided that includes a mold having a top plate (1201), a middle plate (1202), a back plate (1203) with at least one pin (1207) that will penetrate the substrate material (1103) during embossing process and at least two alignment pins (1208). The plates can be silicon, a steel mold (for example, aluminum) or the like. In a preferred embodiment of the present invention, the top plate (1201) is made of aluminum with a layer (1205) of stainless steel with a mirror finish. The mirror finish provides a top surface in which the fluids can be observed through the cavities in the lab card according to an embodiment of the present invention.

Figure 13A:
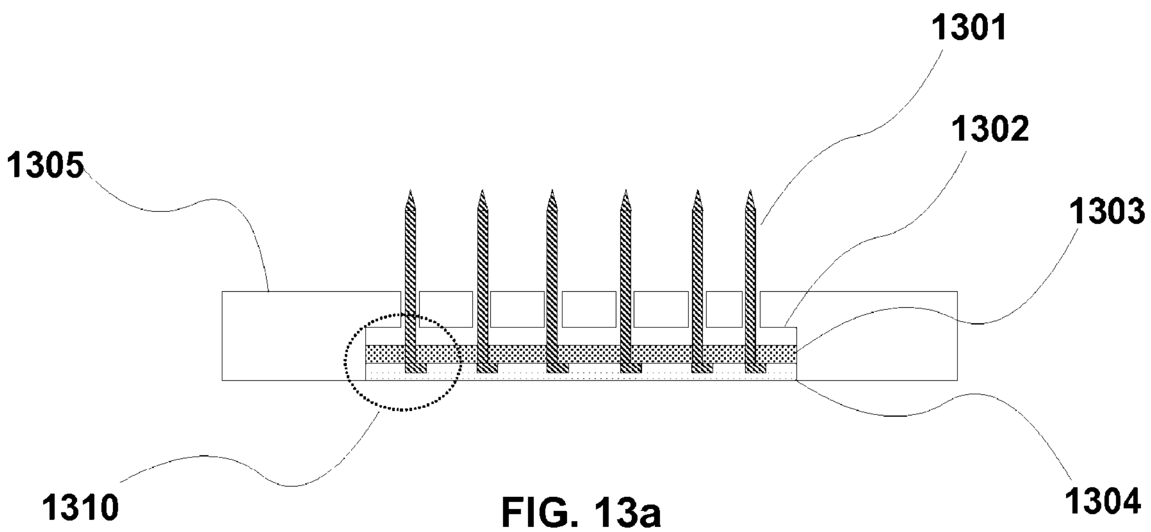
FIGS. 13*a-b* illustrate an embodiment of the present invention of a method of creating a plurality of stabilized pins.
Figure 13B:
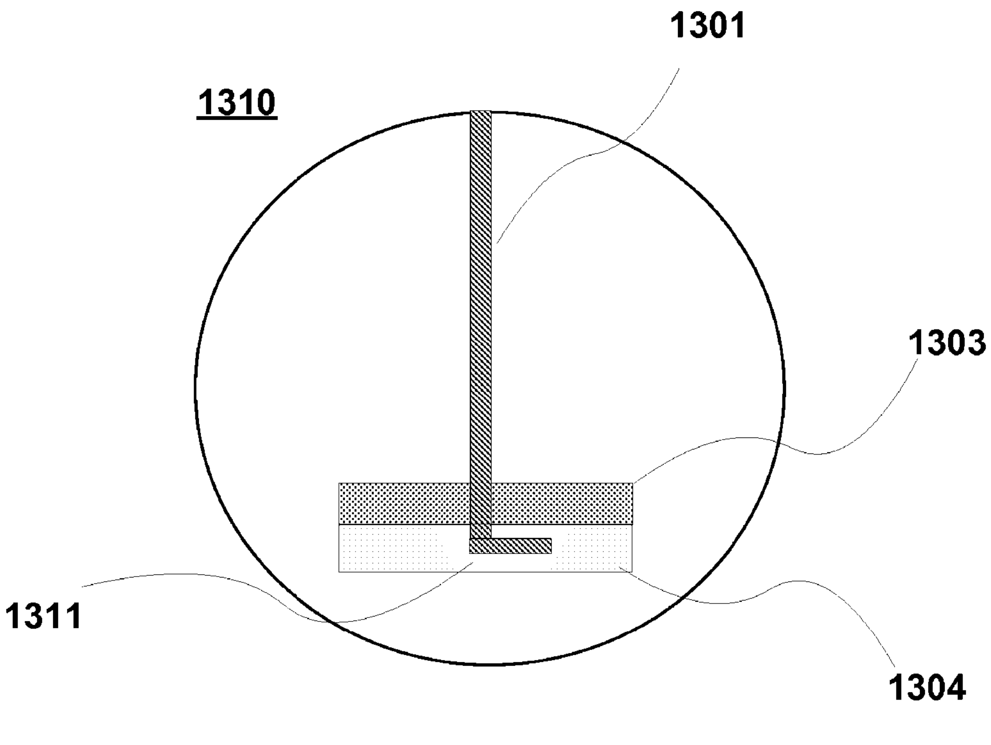

It is to be understood that the above description is intended to be illustrative and not restrictive. Many variations of the invention will be apparent to those of skill in the art upon reviewing the above description and figures. Such variation may include the method of providing the pin(s) in to the plate which include those well known in the art, e.g., (i.e. press fitting the pin into the plate and the like). FIG. 13*a* provides an example of a method to provide at least one pin on a plate, using the indicated shape and size of the pin (1301) as only an example. In this example, the plurality of pins are press fit into a fixture (1302) and bonded for example, with an epoxy. The end of the pin that is protruding from the fixture is bent as shown in FIG. 13*b*. The fixture with the pins is then press fit into the plate and bonded. The various ways of bonding will be apparent to those of skill in the art upon reviewing the above description and figures. The size and shape of the pins will correspond, for example, to the size of the desired microstructures (i.e. channel, chamber, etc.) to be created in the substrate. The pin can be of various shape and sized according to an embodiment of the present invention.

Figure 14A:
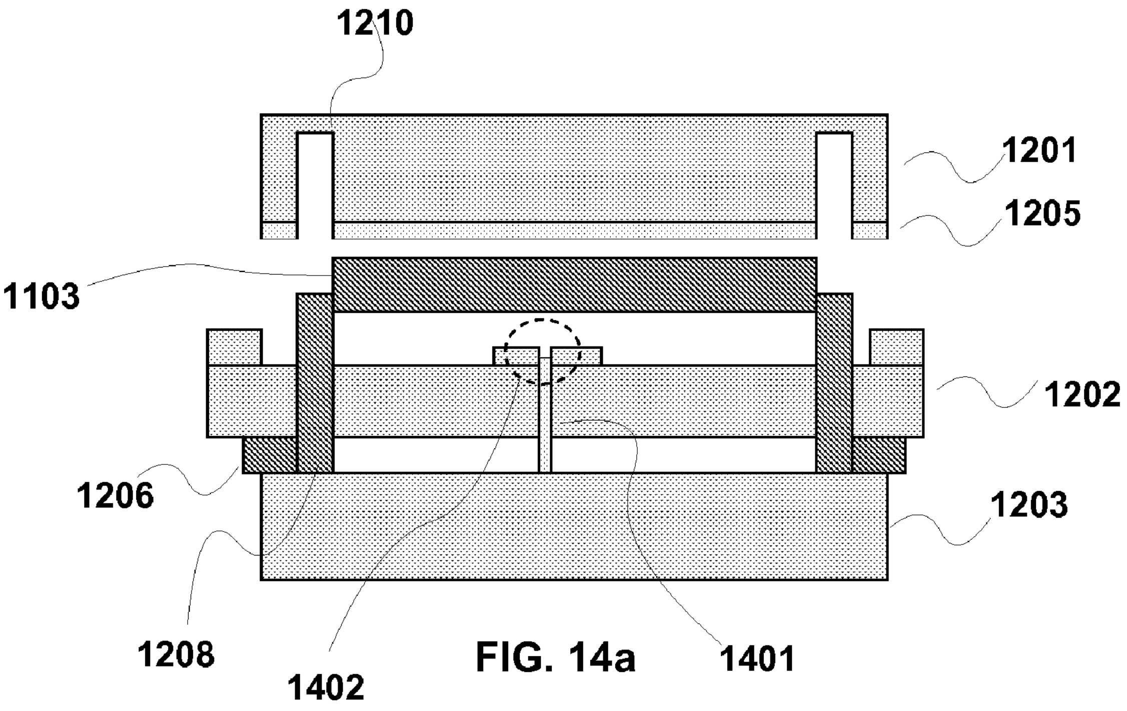
FIGS. 14*a-e* illustrate an embodiment of the present invention of a method of a one-step nano structure embossing method.
Figure 14B:
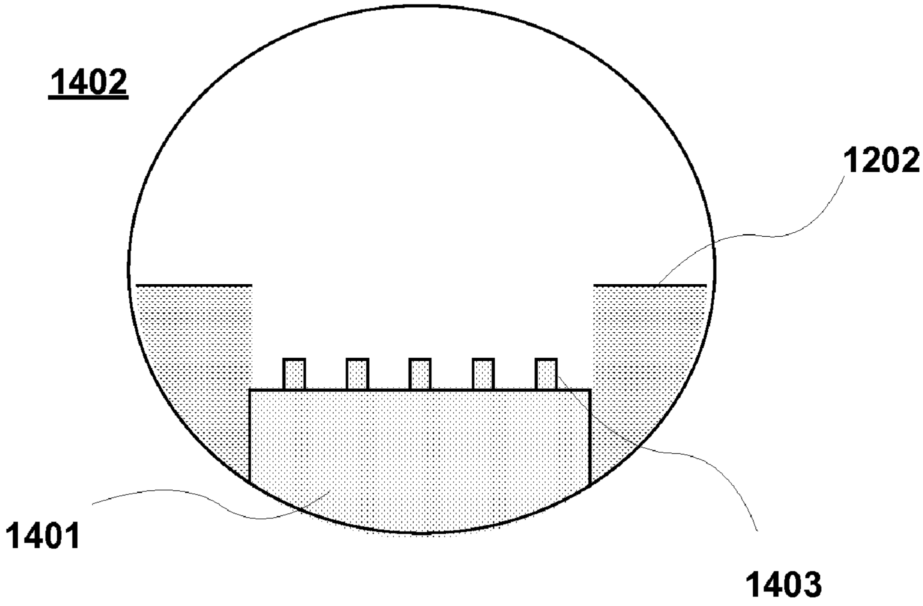
Figure 14C:
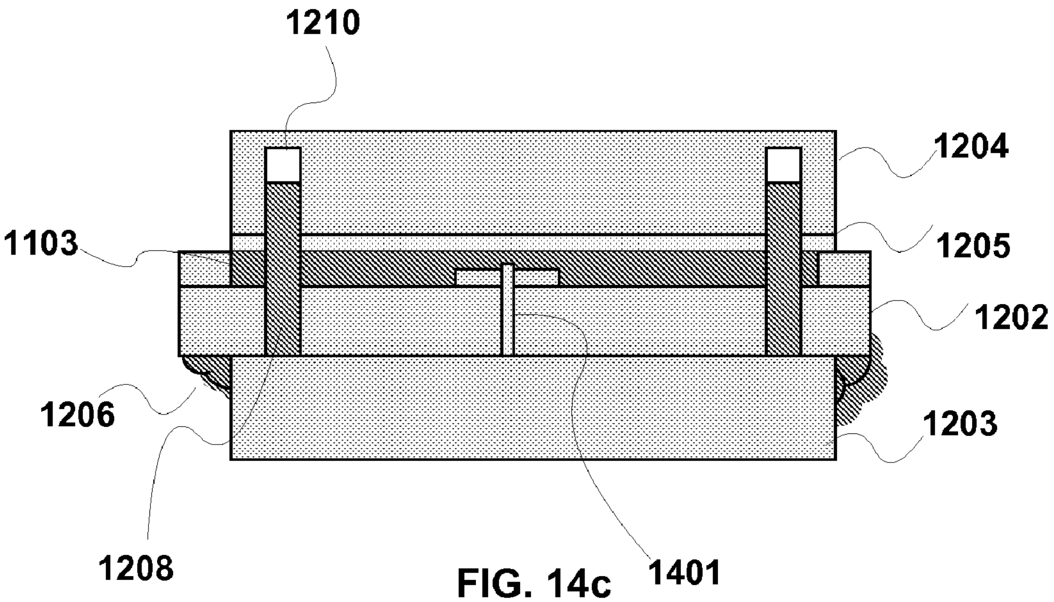

According to an embodiment of the present invention, a delay mechanism is provided to allow some time to pass in a controlled fashion. The delay mechanism may be driven by time, pressure, heat and the like according to another embodiment of the present invention. An example of a delay mechanism using time, is using a computer program to control the time. A preferred embodiment of the present invention is a delay mechanism using a component that is pressure sensitive is, for example, using a spring. In a most preferred embodiment, the delay mechanism comprises a heating component wherein the heating component is at least two spacers. As illustrated in FIG. 14*c*, at least two spacers (1206), which are constructed from materials that have similar softening temperature as the substrate, are provided. In a preferred embodiment, the spacers (1206) are made from the same material as the substrate (1103). The spacers may be made of a different material however having the desired glass transition temperature. The pins (1207) and alignment pins (1208) are held underneath a plurality of micro features (1209 and 1210) by the spacers (1206).

In a preferred embodiment, the middle plate (1202) is stationary while the top plate (1201) and the back plate (1203) are movable. The substrate raw material is fed between the top plate (1201) and the middle plate (1202) as shown in FIG. 14*a*. In this example, the middle plate (1202) is stationary while the top (1201) and back plate (1203) can move towards the middle plate (1202). Constant pressure is applied to both the top and middle plates such that the physical characteristic of the substrate raw material will dictate when the plates move.

According to an embodiment of the present invention, a back plate (1203) with metal pins (1207) is used during an embossing process. The metal pins (1207) are held underneath the micro features (1209) by the spacers (1206) made from the same plastic material used in embossing. During the embossing process, the entire structure which includes the mold, top plate (1201), middle plate (1202) and back plate (1203) with at least one pin (1207) are heated above $T_g$ (e.g., the glass transient temperature) of the plastic. The plastic then becomes soft and starts to fill the entire cavity. Also, the spacer becomes soft and presses into thin films. Such changes allow the back plate and the mold to come together as the pins penetrates through the entire plastic layer (1103). According to an embodiment of the present invention, a device, a method and a system for making through holes from an embossing process is provided by phasing the embossing process with a delayed hole penetration step. As a result, an embossed plastic substrate with self-aligned holes is created. Hence, certain embodiments of the present invention provide a quick, accurate, and clean process.

FIG. 14*c* illustrates the final molded substrate (1103) with the constructed through holes. The applied temperature and pressure will depend on the type of thermoplastic. In addition, the material densities and thickness of the substrate may also affect the apparatus and process. In a preferred embodiment of the present invention, the design of the molded piece is such that the required pins provide balanced pressure distribution across the substrate when penetrating through the substrate. In one example, four pins penetrate the substrate to provide two sets of through holes with different diameters in the molded substrate (1103). The number of pins that penetrate the substrate will depend on, for example, the application requirements of the device. The surfaces of the plates used for molding may be coated with any number of materials to assist in separating the pieces apart, for example, a releasing agent according to another embodiment of the present invention. Such releasing agent may include those well known in the art, e.g., teflon or the like.

Figure 14D:
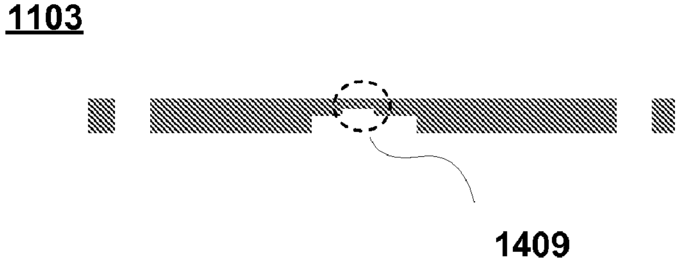
Figure 14E:
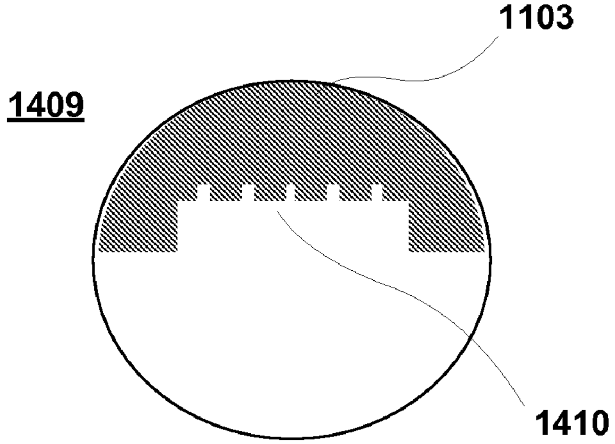

According to another embodiment of the present invention, besides constructing through holes for the fabrication of internal channels and the like, devices, methods and systems are provided for embossing nanoscale fluid structures or other delicate structures at a relatively low cost. FIG. 14*a-e* illustrate an embodiment of the present invention of a method of a one-step nano structure embossing method. As shown in FIG. 14*a*, according to an embodiment of the present invention, a method is provided that includes a mold having a top plate (1201), a middle plate (1202), a back plate (1203) with at least one pin (1401) with a nano structure (1403) that will imprint onto the substrate (1103) during the embossing process, while the plates are kept aligned with the alignment pins (1408). The plates can be silicon, a steel mold (for example, aluminum) or the like. In a preferred embodiment of the present invention, the top plate (1201) is made of aluminum with a layer (1405) of stainless steel with a mirror finish. The mirror finish provides a top surface in which the fluids can be observed through the cavities in the lab card according to an embodiment of the present invention. As shown in FIG. 14*b*, item (1402) is a close up view of the delicate nano structure mold according to an embodiment of the present invention. The example of the nano structure mold is an example. There are many variations of nano structure mold designs well known to one skilled in the are. FIG. 14*c* illustrates the step involved in having the pin with the nano structure imprint onto the substrate according to an embodiment of the present invention. Item (1409) in FIG. 14*d* illustrates the substrate with the imprinted nano structures according to an embodiment of the present invention. Item (1410) in FIG. 14*e* illustrates a close up view of the imprinted nano structures according to an embodiment of the present invention. There can be a plurality of pins with nano structure designs using the method described above according to an embodiment of the present invention.

As a miniaturized device, the body of the device, for example a lab card, will typically be in the range of 1 to 20 cm in length by in the range of 1 to 15 cm in width by in the range 0.1 to 2.5 cm thick, preferably in the range of 2 to 15 cm in length by in the range of 2 to 10 cm in width by in the range 0.1 to 1.5 cm thick, most preferably about 7.6 cm in length by about 5.1 cm in width by about 0.64 cm. Although indicative of a rectangular shape, it will be readily appreciated that the devices of the present invention may be embodied in any number of shapes depending upon the particular need. Additionally, these dimensions will typically vary depending upon the number of operations to be performed by the device, the complexity of these operations and the like. As a result, these dimensions are provided as a general indication of the size of the device. The number, shape and size of the channels included within the device will also vary depending upon the specific application for which the device is to be used.

Figure 15:
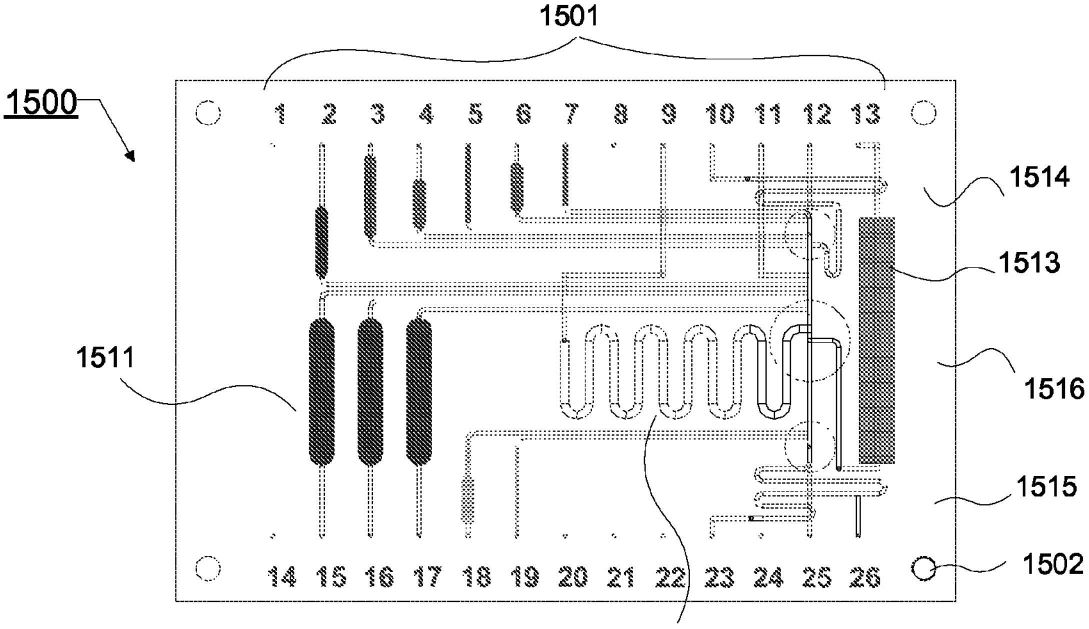
FIG. 15 illustrates a layout of a lab card according to an embodiment of the present invention.

FIG. 15 illustrates another application which is an example of a layout of a microfluidic card or a lab card (1500) according to an embodiment of the present invention. This diagram is merely an example, which should not unduly limit the scope of the claims. One of ordinary skill in the art would recognize many variations, alternatives, and modifications. The lab card design layout includes storage chambers (1511), mixing channels (1512) and a waste chamber (1513). In addition to the chambers and channels, this design also includes areas for heating/cooling (1514 & 1515) and a magnet to be applied (1516). The reagents can be stored in a measuremetric microfluidic system with controllable valves, as described previously, wherein the valves will stop the fluids at desired locations. Computer software products are provided to control the various active components (i.e., fluidic structure, valves, etc.).

VI. Gas Pressure/Vacuum Driven Source

The transportation of fluid within the device of the invention may be carried out by a number of various methods. Internal pump elements which are incorporated into the device may be used to transport fluid samples through the device. Alternately, fluid transport may be affected by the application of pressure differentials provided by either external or internal sources as described in U.S. Pat. No. 6,168,948, Miniaturized Genetic Analysis Systems and Methods, which is hereby incorporated by reference in its entirety for all purposes.

Figure 16:
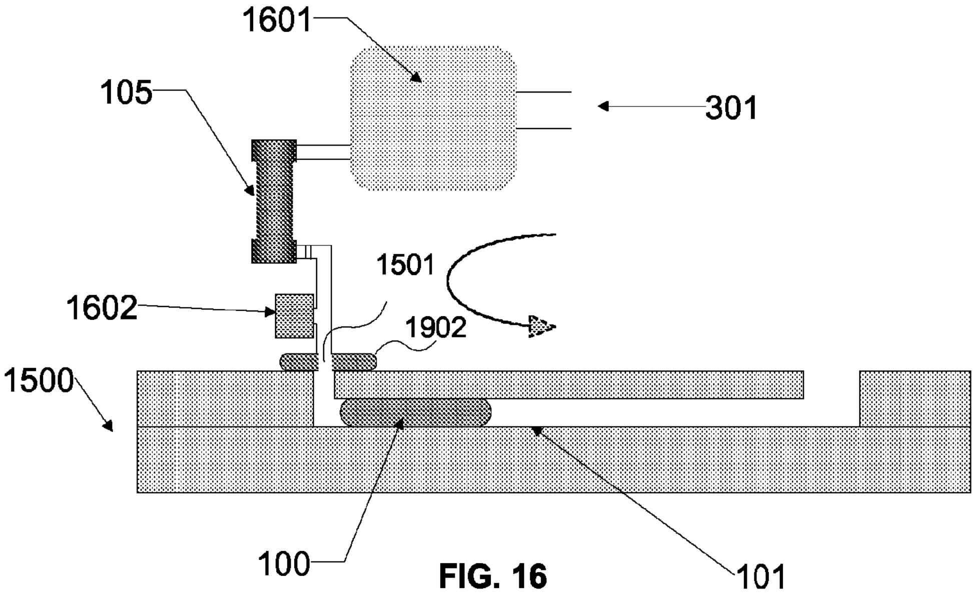
FIG. 16 illustrates an air-driven microfluidic mechanism according to an embodiment of the present invention.

According to an embodiment of the present invention, an air-driven microfluidics mechanism is provided as shown in FIG. 16. This diagram is merely an example, which should not unduly limit the scope of the claims. One of ordinary skill in the art would recognize many variations, alternatives, and modifications. This system as mentioned earlier can be utilized in various applications. This microfluidic mechanism is used to deliver a volume of liquid (100) into at least one channel, for example, an inlet channel (101) or chamber within a lab card (1500). This mechanism includes a pressure source (301), a pressure regulator (1601), a valve (105), and a pressure sensor (1602). In a preferred embodiment, the valves are controllable such that the valves are activated to move a liquid or reagent (100) forward into a channel. A pressure source, for example, filtered pressured gas or air (301) is used as the driving force and is regulated by high precision pressure regulators (1601) according to a preferred embodiment of the present invention. In general, the high precision pressure regulators range will be from about 0 psi to about 5 psi, preferably from about 0 psi to about 2 psi. Computer controlled mini air valves may be used to control the air flow and integrated pressure sensors for pressure recording. The movement of liquid is controlled by gas or air pressure and valve open time. Examples of microfluidic valves as well as fluid flow and control is discussed in, for example, Paul C. H. Li, Microfluidic Lab-on-a-chip for Chemical and Biological Analysis and Discovery, 2006, and A. van den (Albert) Ber, et al, Lab-on-Chips for Cellomics, 2004 and Oliver Geschke, et al, Microsystem Engineering of Lab-on-a-chip Devices, 2004, each of which is hereby incorporated by reference in its entirety for all purposes.

In one embodiment of the present invention, the device will include a pressure/vacuum manifold for directing an external vacuum source to the various reaction/storage/analytical chambers/channels to direct and process the reagents within the hand held disposable device. According to another embodiment of the present invention, all fluid transport or processing is performed within lab card(s) by utilizing pressurized gas, vacuum and vents with a pneumatic manifold. Performing an assay can require several types of processes. Examples of processes that are directed by a gas driven source include reagent delivery, storage, reaction, mixing, bubble removing, purification, drying, waste storage and the like according to some embodiments of the present invention. According to a preferred embodiment, the gas is air. Introducing a reagent and moving a reagent forward in a channel are examples of processes where a pressurized air is applied and a valve is opened for a specific desired time. Mixing is an example of a process where a combination of a vacuum and air pressure is utilized. Reversing the flow of reagent is an example of a process when a vacuum is utilized. Another example, is applying a vacuum into the system, for example, to remove alcohol after purification. One other example is carrying out a number of preparative and analytical reactions for introducing multiple samples and performing multiple reactions and steps as described in U.S. patent application Ser. No. 11/553,944, which is hereby incorporated by reference in its entirety for all purposes. It is to be understood that the above examples are intended to be illustrative and not restrictive. Many variations of the invention will be apparent to those of skill in the art upon reviewing the above description and figures. Such variation may include other ways of utilizing pressurized air, vacuum and vents to process the fluids.

Figure 17:
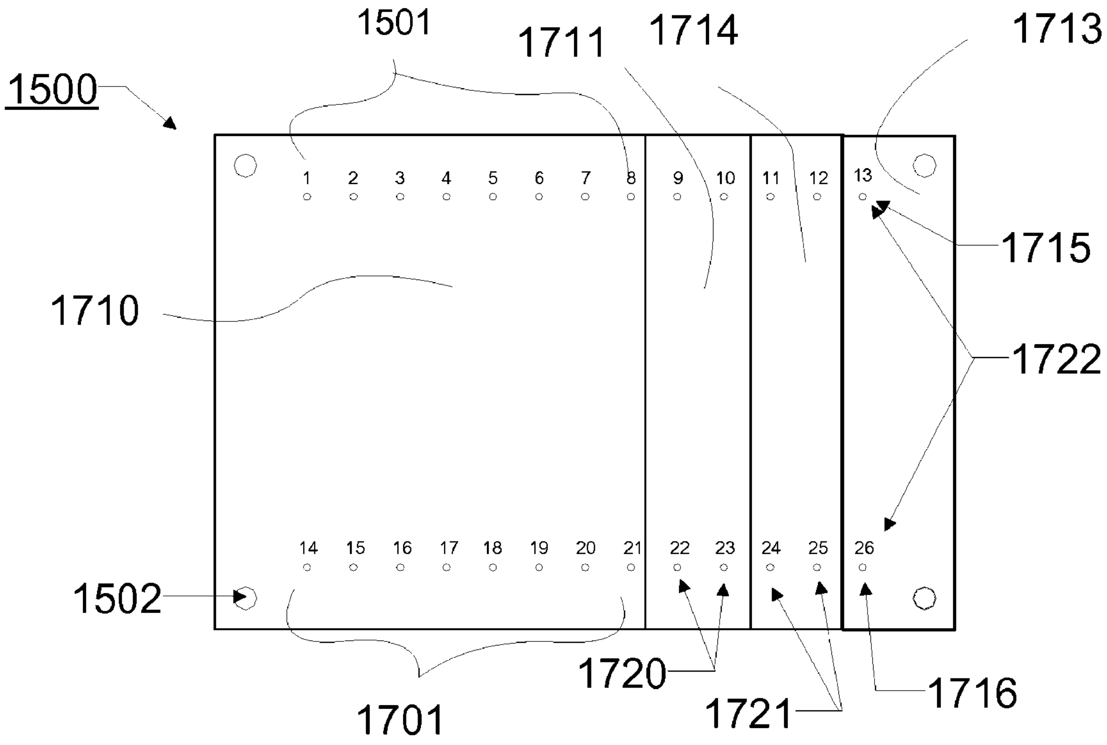
FIG. 17 illustrates the top view of a lab card according to an embodiment of the present invention.

The configuration and air requirements of a lab card will depend on several factors, such as, for example, number of reagents, type of assay, number of assay, number of reactions, etc. according to an embodiment of the present invention. An example of a lab card configuration according to an embodiment of the present invention is illustrated in FIGS. 15 and 17. According to an embodiment of the present invention, a lab card (1500) has a various number of ports (1701), identified as numbers 1-26. As illustrated in FIG. 17, the ports that require similar pneumatic requirements are grouped together: 1710 (air pressure), 1711 (vacuum/air pressure), 1712 (vent/air pressure) and 1713 (vent/vacuum) and placed on the front surface of the lab card according to another embodiment of the present invention. The ports in the first section (1710) are referred to as reagent ports (1-8 and 14-21) since air pressure is required to push the reagents forward from the reagent storage areas. The ports in the second section (1711) are referred to as control ports (9, 10, 22 and 23) since vacuum, air pressure or a combination is required to perform the desired process step. The ports in the third section (1712) are referred to as vent ports (11, 12, 24 and 25) where a vent or air pressure is delivered. The ports in the forth section (1713) are referred to as waste and collection ports (13 and 26 respectively) where vent and vacuum are utilized. Depending on which reagents/channels are being utilized will depend on whether the air pressure is applied to push the fluid into the waste or collection chamber or whether a vacuum is applied to pull the fluid into the waste or collection chamber. The various ways of configuring the ports will be apparent to those of skill in the art upon reviewing the above description and figures. The number and location of the ports will depend on, for example, to the application requirements of the assay and the pneumatic manifold assembly.

Figure 18:
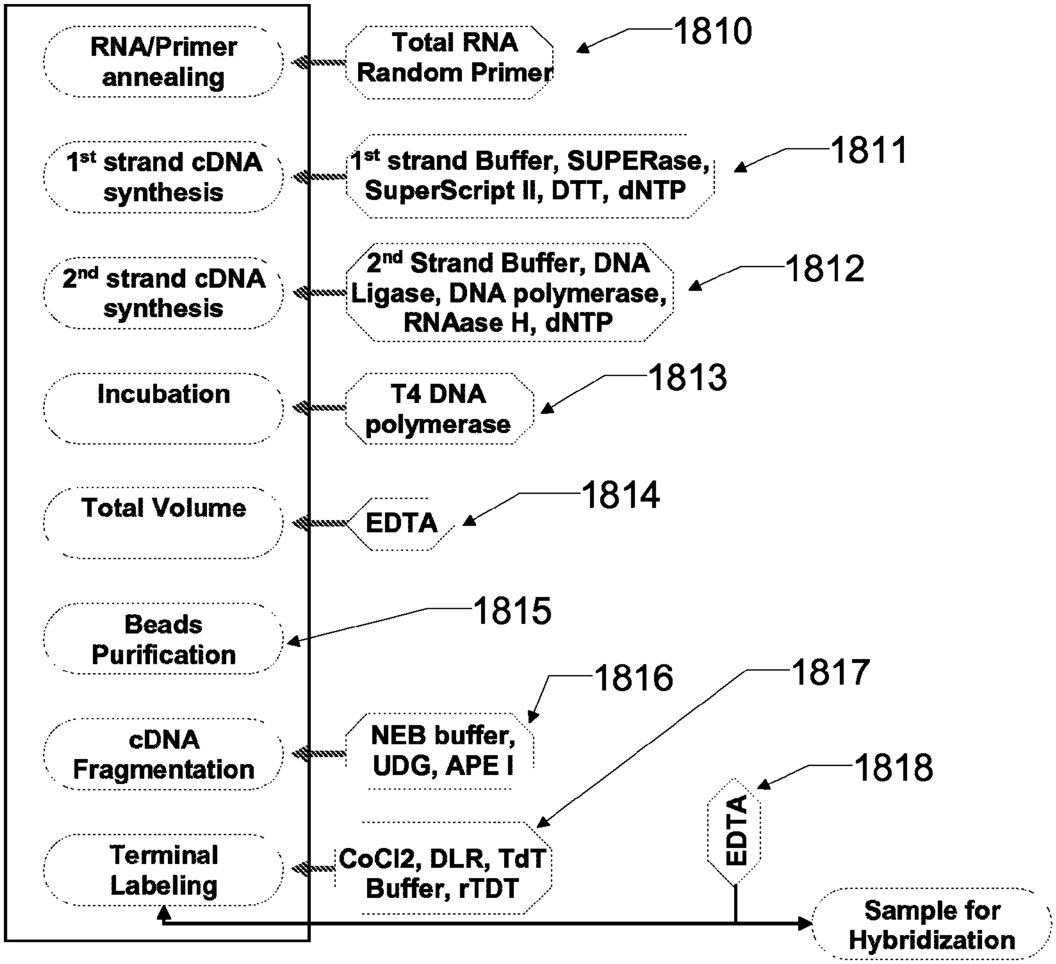
FIG. 18 illustrates an example of an application with 12 liquids, a WTA Assay.

Most assays require multiple reagents to be added to multiple reactions. In many embodiments, the liquid is a reagent for a biochemical reaction. In this example, the lab card is being used to perform a WTA assay according to an embodiment of the present invention. This diagram is merely an example, which should not unduly limit the scope of the claims. One of ordinary skill in the art would recognize many variations, alternatives, and modifications. As shown in FIG. 18, this WTA assay provides several reactions that uses various numbers of reagents. The assay begins with the first sample, Total RNA (1801). The next step adds the second reagent (1811) which includes $1^{st}$ strand Buffer, SUPERase, SuperScript II, DTT, and dnTP such that the $1^{st}$ strand cDNA is synthesized. The $2^{nd}$ strand cDNA is then synthesized when the third reagent (1812) is added. During incubation, the forth reagent (1813) is added. A total volume of 16.2 μl is achieved when the fifth reagent, EDTA (1814) is added. The beads purification step (1815) involves 4 reagents: magnetic beads, alcohol, alcohol, and water. The cDNA fragmentation is completed with the addition of the $10^{th}$ reagent (1816). After, the eleventh reagent (1817) is added to performed the Terminal Labeling step. The last reagent, EDTA, (1818) is added to provide a sample for hybridization. A total of 12 reagents are involved in this WTA assay. This sample may then be hybridized with an Affymetrix U133A chip.

According to a preferred embodiment of the present invention, an example of utilizing the above specified sections of the lab card is illustrated in FIGS. 15 and 17. In this example, port 6 performs the primer annealing mix, port 4 performs the $1^{st}$ strand synthesis, and port 3 performs the $2^{nd}$ strand synthesis. Port 5 performs the T4 DNA polymerase, port 7 adds the EDTA, and port 2 adds the water. Port 15 introduces the beads solution, and port 16 and 17 provides the alcohols. Port 18 performs the fragmentation, port 19 performs the labeling, and port 20 adds the EDTA. Ports 11, 12, and 25 are the chamber vents. Ports 9, 10, and 23 are used for mixing. Port 13 is the waste port, and port 26 is the collection port. Merely by way of example, the invention is described as it applies to preparing nucleic acid samples for hybridization, but it should be recognized that the invention has a broader range of applicability. For example, the microfluidic card is designed for Whole-Transcriptome-Assay or WTA as described above. In another example, the lab card can be used in many other assays such as expression, genotyping, disease diagnose, etc.

VII. Various Multiple Lab Cards

In another aspect of the present invention, a microfluidic system may comprise of a number of different types of devices or lab cards as described below according to some embodiments of the present invention.

Sample Card and Reagent Card

According to an embodiment of the present invention, a reagent card may include both the samples and the reagents to perform an assay as discussed previously in this application. All the reagents and sample are transferred to the reaction card such that all the reagents including the sample required to perform an assay are provided within the lab card according to an embodiment of the present.

According to another embodiment of the present invention, a sample card is provided wherein at least one sample of at least one patient is included in a lab card which is separate from the reagent card. The sample from the sample card may be transferred into the reagent storage card or directly to the reaction card.

The reagent card can be a universal reagent card wherein the reagents to perform the desire assays are standard according to another embodiment of the present invention. These universal reagent cards may be used with different sample cards, reagent cards and array processing cards.

The lab cards that are used to store sample and reagents may include an apparatus that provides a cold storage mechanism designed to keep the store sample(s) and reagent(s) within the lab card(s) at the desired temperature storage conditions according to an embodiment of the present invention.

Reaction Card

According to an embodiment of the present invention, a reaction card is provided wherein processes or reactions are directed by a gas or vacuum and processed with the contained reagent within the lab card. This provides a device, method and system where the contamination and error from handling reagents is significantly reduced or eliminated. A waste and collection chambers are provided within the lab card to assure that all the reagents are self contained in the lab card. Examples of reactions or processes that are performed by a reaction card are sample prep, target prep, and other various assays.

A universal card is provided by having components that are common across a number of assays in a lab card and the other components that are specific to an assay on a separate card according to an embodiment of the present invention. For example, typically for assay development, the same reagents are used with different reactions. Thus, a universal reagent card may be utilized with various reaction cards. On the other hand, for performing different assays, in general, different reagents are required while performing the same reactions. Users can use different reactions cards for different assays with a universal reaction card.

Array Processing Card

Figure 19A:
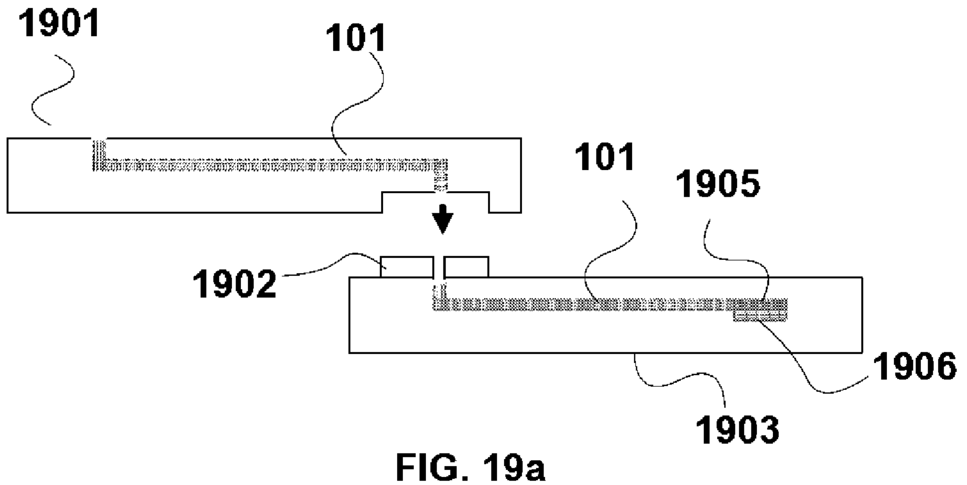
FIGS. 19*a*-19*c* illustrate images of chip-to-chip interface structures according to some embodiments of the present invention.

According to a preferred embodiment, an array processing card including a lab card comprising at least one probe array (1906) is provided as illustrated in FIGS. 19*a, b* and *c*. The array processing card performs reactions that include at least one array such as, for example, hybridization, wash, stain, scan, reading and the like according to an embodiment of the present invention.

Alternately, the array processing card can perform a plurality of these steps within the array processing card according to another embodiment of the present invention. Integrating bioarrays into a microfluidic card makes the entire assay fully automated and/or minimize the difficulties in transferring small amount liquid from microfluidic card to a, for example, hybridization card.

The device, systems and methods of the present invention has a wide variety of uses in the manipulation, identification and/or sequencing of nucleic acid samples according to certain embodiments of the present invention. These samples may be derived from plant, animal, viral or bacterial sources. For example, the device, method and system of the invention may be used in diagnostic applications, such as in diagnosing genetic disorders, as well as diagnosing the presence of infectious agents, e.g., bacterial or viral infections. Additionally, the device, method and system be used in a variety of characterization applications, such as forensic analysis, e.g., genetic fingerprinting, bacterial, plant or viral identification or characterization, e.g. epidemiological or taxonomic analysis, and the like.

According to another embodiment of the present invention, high-throughput lab card (e.g., microcard) (e.g., 10× or 100×) for various applications, such as 96 wells are provided. A lab card, for example, a reaction card can perform, for example, 1, 2, 3, 4 . . . 96 reactions on an individual card. For example, a reaction card may be used for a plurality of assays, for example, WTA and WGSA. Typically, with more reactions, the number of ports and the size of the lab card will increase with the increased number of reactions.

Individual Component Inserts

Figure 19B:
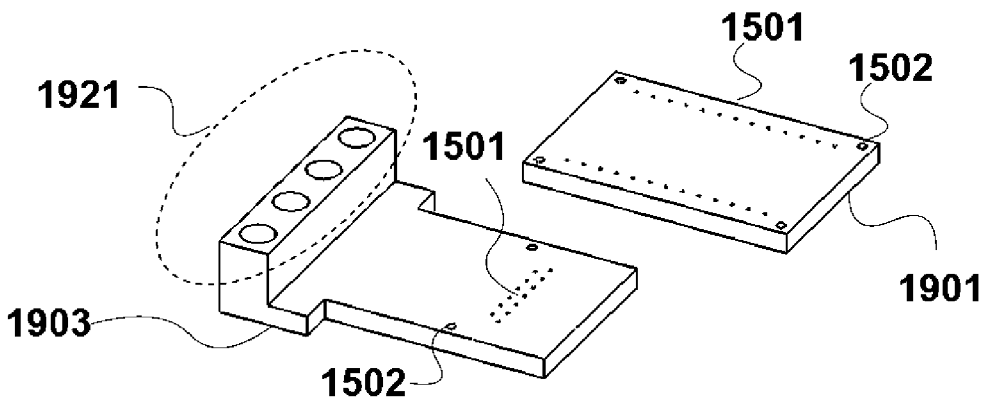

According to another embodiment, at least one individual component insert (for example, reagent, array, etc.) is incorporated into a lab card. FIGS. 19*b* and *c*, illustrates an example of a lab card wherein there are a plurality of card features (1921) for individual component inserts. The various ways of incorporating at least one individual component inserts into a lab card will be apparent to those of skill in the art upon reviewing the description and figures.

An array component, for example, can be placed and positioned in various ways within a lab card. For example, the array(s) can be located within a chamber as illustrated in FIG. 19*a* or 19*b* where the hybridization, wash, stain and scan are performed with the same array processing card. Alternately, the array can be part of an insert according to another embodiment of the present invention. The incorporation, for example, can be in the way of "array pegs" and the like. The assembly of array pegs which include for example, assembling an array with a peg, is described in U.S. Pat. No. 6,660,233 and U.S. patent application Ser. No. 11/347,654 which are hereby incorporated by reference herein in their entirety for all purposes. By having the flexibility of being able to take the array in and out of a lab card may simplify the design of the lab card(s). For example, an array can be placed into an array processing card to perform the hybridization, wash, and stain and then be placed into a separate array processing card for scanning according to another embodiment of the present invention.

Figure 19C:
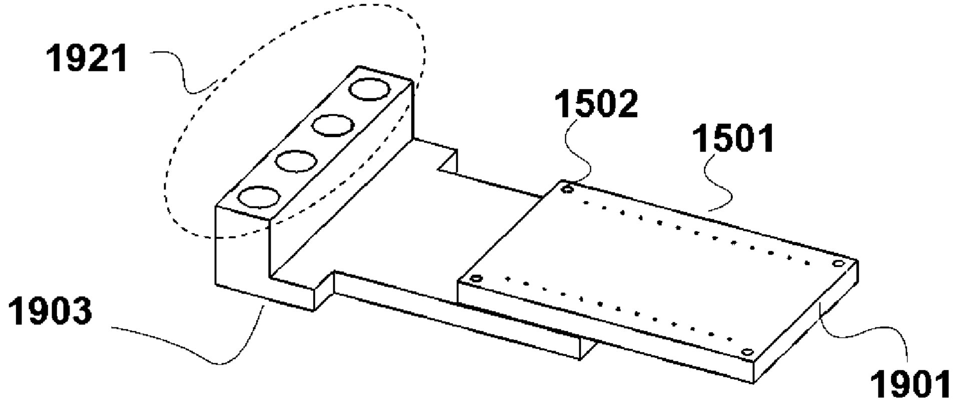

In another embodiment of the present invention, a universal array processing card is provided where the array processing card includes card features where various number and types of array pegs can be inserted. Different arrays can be assembled into this universal array processing card depending on the application. According to another embodiment of the present invention, a plurality of samples can be processed simultaneously using a lab card. FIGS. 19*b* and 19*c* illustrate an array processing card (1920) with a plurality of card features (1921) to insert a plurality of array pegs. According to another embodiment of the present invention, a plurality of lab card features of, for example, 1, 2, 3, 4, . . . up to 96 may be provided within a lab card. The multi well format is described in U.S. Pat. No. 6,399,365, U.S. Pat. No. 5,545,531 and U.S. application Ser. No. 11/347,654 which are hereby incorporated by reference herein in their entirety for all purposes. Similarly, individual components which comprises reagents can be inserted into a universal lab card according to another embodiment of the present invention.

VIII. 2-Stage Lab Card

Although primarily described in terms of producing a fully integrated body of the device for performing a particular assay wherein all the reagents including the sample is provided in the device along with all the microfluidic features required to perform an assay, the above described methods can also be used to fabricate additional lab cards which are used to perform separate process steps according to a preferred embodiment of the present invention. The lab card is design such that the reagents can be transferred from one to the other according to an embodiment of the present invention.

A system for controlling liquids is provided which comprises a plurality of lab cards according to an embodiment of the present invention. According to an embodiment of the present invention, a two stage platform is provided where fluid reagents are transferred from a reaction/storage/analytical chamber from a first lab card to a another chamber in a second lab card. The first lab card comprises at least one outlet port and the second lab card comprises at least one inlet port. A positive pressure source may be applied to the originating chamber in the first lab card to push the reagent into the chamber in the second lab card. FIGS. 19*a, b* and *c* illustrate images of chip-to-chip interface structures according to some embodiments of the present invention. This diagram is merely an example, which should not unduly limit the scope of the claims. One of ordinary skill in the art would recognize many variations, alternatives, and modifications. According to an embodiment, as illustrated in FIG. 19, a reaction card (1901) with at least one channel (1501) is mated over an array processing card (1903) with at least one channel (1501), one chamber (1905), at least one array (1906) and at least one gasket (1902). The gasket (1902) may be mounted on the reaction card (1901) or the array processing card (1903) according to another embodiment of the present invention.

A gasket comprises a first surface and a second surface, wherein the first surface is flat around the inlet port to assure a liquid tight seal when mated to the second device. The gasket (1902) can be press fit or attached, for example, by adhesive, into the port before or after the mating of the lab cards. A housing may also be provided which includes an alignment and a clamping mechanism to align and clamp the two lab cards together according to another embodiment of the present invention. The compression of the gasket permits liquid to flow from the first device to the second device.

According to another embodiment, as illustrated in FIGS. 19*b* and *c*, an array processing card (1903) includes a plurality of card features (1921) to insert a plurality of array pegs. In a preferred embodiment, alignment features or holes (1502) are provided to assure that the cards are properly aligned. The reagent card (1901) is mated over the array processing card (1903) with a plurality of ports (1501) aligning the alignment holes (1502) such that a plurality of ports (1501) on the reagent card (1901) matches to the ports (1501) on the array processing card (1903) such that the reagents travel from the reaction card to the array processing card. The supporting apparatus may have a clamping mechanism to press the two cards together according to another embodiment of the present invention.

According to another embodiment of the present invention, more than two cards can to assembled simultaneously to transfer the reagents. For example, a first lab card that is used to store a set of reagents, a second lab card that is used to perform a first assay, and a third lab card that is used to perform the next assay, can be assembled together such that both assays are performed without any manual intervention. It is to be understood that the above description is intended to be illustrative and not restrictive. Many variations of the invention will be apparent to those of skill in the art upon reviewing the above description and figures. Such variation may include a sample card, a reagent storage card, a reaction card and an array processing card to perform a complete assay, and the like according to embodiments of the present invention. According to another embodiment, the apparatus to perform the two-stage process is incorporated in the base plate assembly.

IX. System to Operate Lab Cards

Figure 20:
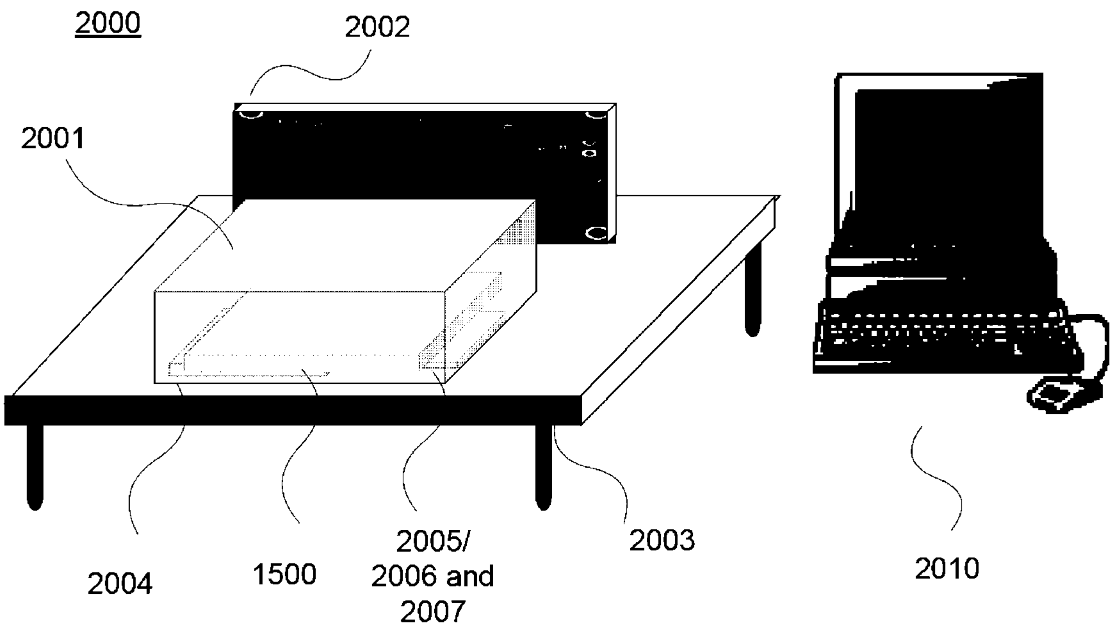
FIG. 20 illustrates an example of a microfluidic or lab card system according to an embodiment of the present invention.

A system to operate a microfluidic card which may also be called a microfluidic or lab card system is shown in FIG. 20 according to an embodiment of the present invention. This diagram is merely an example, which should not unduly limit the scope of the claims. One of ordinary skill in the art would recognize many variations, alternatives, and modifications. FIG. 20 illustrates a system (2000) with a manifold assembly (2001) placed on top of the lab card (1500). A printed circuit board, PCB, (2002) is provided for controlling functions, for example, temperature control. Both the PCB (2002) and the manifold (2001) with all its components are mounted onto a base plate (2003). The manifold (2001) includes mechanical valves, pressure sensors, pressure regulators, etc. A microfluidic or lab card (1500) is placed into a pocket in the base plate and the external components, for example, a cooling unit (2004) and a heating (2005)/cooling (2006) and a magnetic unit (2007)) are mounted onto the base plate (2003) according to an embodiment of the present invention. Other examples of external components include optics, electrical fields, etc. according to an embodiment of the present invention. A computer (2010) is used for several functions, for example, controlling the valves.

FIG. 21*a-e* illustrate an overall enclosed system (2000) including a pneumatic manifold assembly (2001) placed on top of a lab card (1500) mounted onto a base plate assembly (2003) controlled by a computer (not shown) according to an embodiment of the present invention. In a preferred embodiment, all fluid transport or processing is performed within lab card(s) by utilizing pressurized air, vacuum and vents with a pneumatic manifold (2001). All the reagents that are required to perform an assay is stored in a lab card(s) so that there is no handling of any liquids while performing an assay according to an embodiment of the present invention. The reagents can be transferred from a lab card that stores the reagents into storage chambers of a lab card that performs a reaction. The processed reagents from a lab card can also be transferred into another lab card that is configured to perform the next process step. Waste chambers are provided in the lab card to collect the generated waste. Thus, the reagents are contained within the lab card throughout the entire process. Application of a positive pressure to the fluid inlet, combined with the selective opening of the other valves may introduce the sample into the channels/chambers. The combination of providing a vacuum, air pressure or vent provides the various processes described above that is required to perform an assay. According to an embodiment of the present invention, all the external processing components are mounted onto a base plate.

The overall system excluding the computer and manifold will typically be approximately 11 inches in length×8 inches in width×6 inches in height or smaller according to a preferred embodiment of the present invention. Although indicative of a rectangular shape, it will be readily appreciated that the devices of the invention may be embodied in any number of shapes depending upon the particular need. Additionally, these dimensions will typically vary depending upon the number of operations to be performed by the device, the complexity of these operations and the like. As a result, these dimensions are provided as a general indication of the size of the device. The number, shape and size of the channels included within the device will also vary depending upon the specific application for which the device is to be used. According to an embodiment of the present invention, an imaging/scanning instrument is integrated into the fluidic control instrumentation.

According to another embodiment of the present invention, the system, in general is portable. The base plate assembly, manifold and the lab cards that do not require extra storage conditions are placed into a transporting apparatus such that a user can carry the system from one location to the next according to an embodiment of the present invention. The system can be shipped back for trouble shooting or maintenance as required according to an embodiment of the present invention. The automated system requires minimal training and can be operating with minimal operator intervention.

Computer software products are provided to control various active components (i.e. the valves, or liquids, microfluidic system, etc.), temperature and measurement devices. The system may conveniently be controlled by any programmable device, preferably a digital computer such as a Dell personal computer. The computers typically have one or more central processing unit coupled with a memory. A display device such as a monitor is attached for displaying data and programming. A printer may also be attached. A computer readable medium such as a hard drive or a CD ROM can be attached. Program instructions for controlling the liquid handling can be stored on these devices.

According to an another embodiment of the present invention, a barcode reader, Radio Frequency Identification (RFID), magnetic strip, or other means of electronic identification is integrated into the microfluidic or lab card system. Use of the electronic identification mechanism may assure that the proper components (for example, lab cards, reagents, array pegs, individual reagent components, manifold, base plate assembly) are used and the components are placed properly. The identification mechanism may also provide data related to the design or conduct of experiments. A lab card (1500) may include, for example, a barcode label which identifies the particular lab card and the components within the lab card. Further, a barcode reader (not shown) may be disposed within base plate assembly (2100) to read the barcode label as the lab card is being removed from/or placed into the base plate assembly (2100). In this manner, the lab cards may include a barcode label that is scanned with a fixed barcode reader. The use of barcodes is also described in U.S. Pat. No. 6,399,365 and U.S. Pat. No. 7,108,472 which are hereby incorporated by reference herein in their entirety for all purposes.

The PC board may be configured to control all of the operations so that scanning takes place in a fully automated manner. Conveniently, a barcode scanner may be employed to identify the lab card contents to the host computer. Conveniently, a computer having a display screen may be coupled to the PC board and may include a networking interface to permit convenient interaction with the scanner and the other apparatuses. Further, the host computer may include appropriate display screens to permit manual operation of any of the above steps and to permit tracking of a specific components (for example, lab card) based on the barcode information.

X. Manifold Assembly

FIGS. 21*a-e* illustrate an example of a preferred pneumatic manifold system according to an embodiment of the present invention. FIGS. 21*a-e* shows the front, side, top, and bottom view respectively of the manifold system. These diagrams are merely examples, which should not unduly limit the scope of the claims. One of ordinary skill in the art would recognize many variations, alternatives, and modifications.

According to an embodiment of the present invention, the weight of the manifold is utilized to assist in creating an air tight connection between the manifold and the lab card by placing the manifold on top of the lab card as shown in FIG. 21*a-e*. According to another embodiment of the present invention, a manifold is designed such that the movement of the liquid(s) in the lab card can be viewed. A set of clamping features (2103) assures an air tight seal between the manifold and the lab card. The various ways of connecting the lab card to the manifold will be apparent to those of skill in the art upon reviewing the above description and figures. The connection, for example, can be screws, clamps, latches, and the like.

Figure 22:
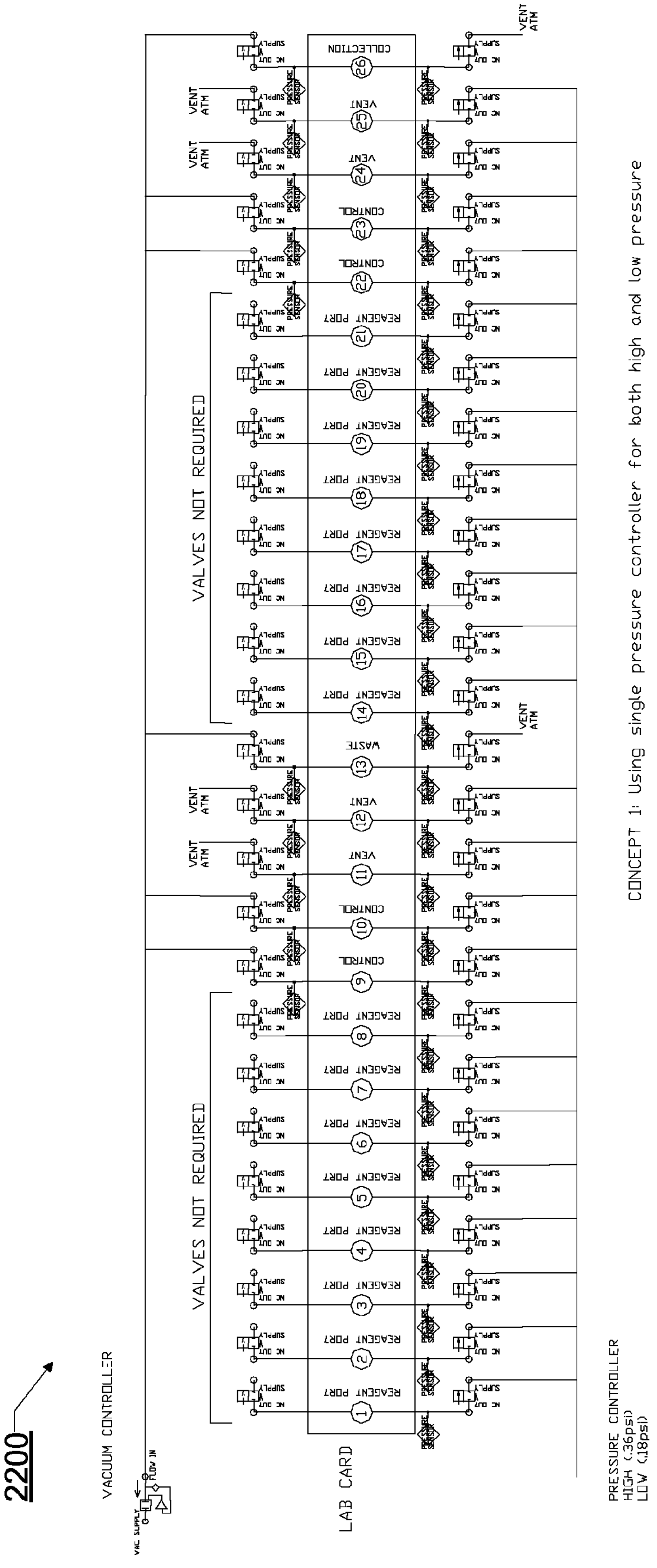
FIG. 22 illustrates a set of requirements according to an embodiment of the present invention for a pneumatic manifold.
Figure 23:
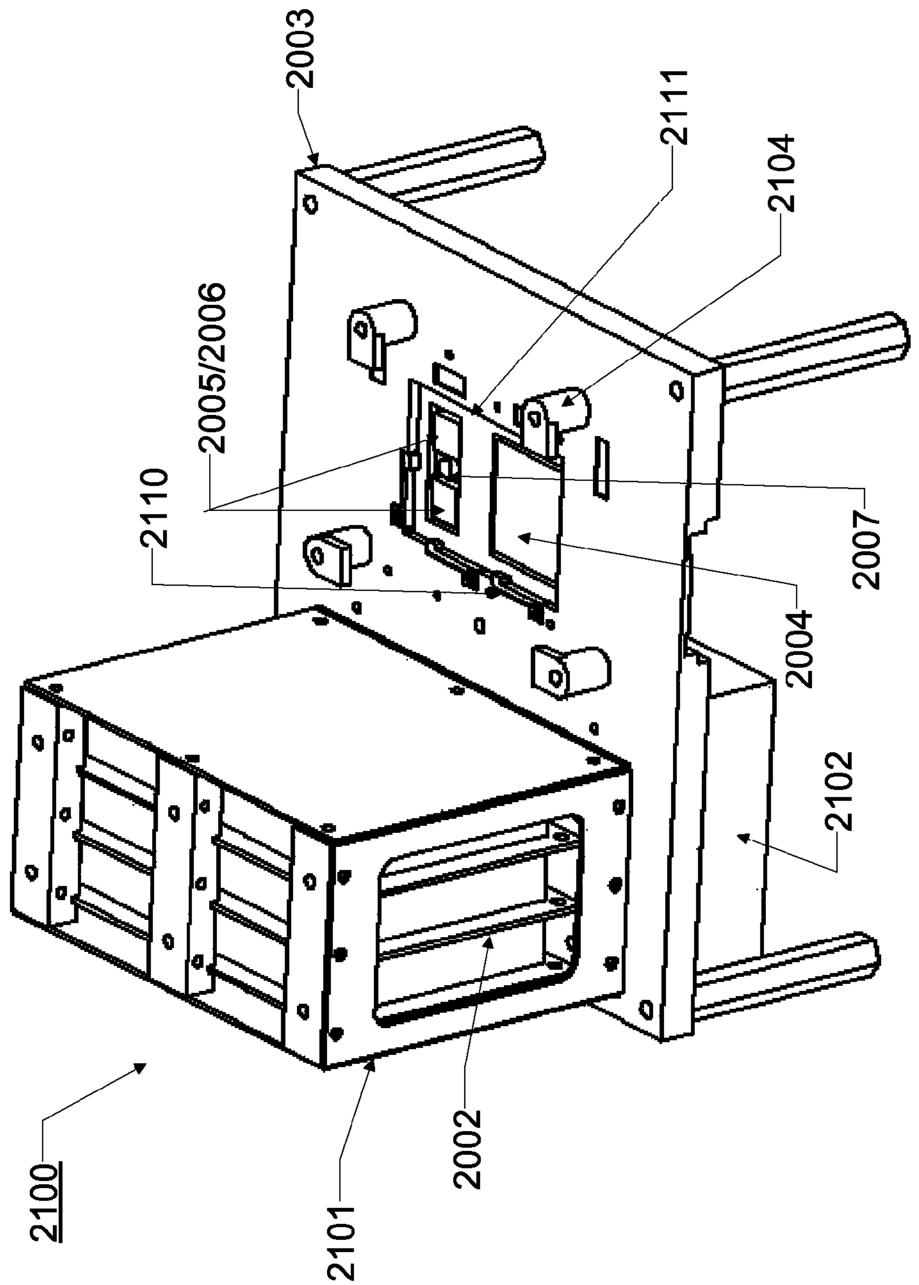
FIG. 23 illustrates a base plate assembly according to an embodiment of the present invention.

A universal manifold assembly is provided by separating all the gas or air requirements from the rest of the processing components that do not require a gas drive source according to an embodiment of the present invention. A set of air requirements (2200) is illustrated in FIG. 22 according to another embodiment of the present invention. The set of air requirements will influence the design of the pneumatic manifold assembly (2001). For example, the manifold shown in FIG. 21*e* integrates 36 valves (2120), 36 pressure sensors (2121), and pressure and vacuum controllers (2122) to deliver the air requirements illustrated in FIG. 22 according to an embodiment of the present invention. Air pressure, vacuum/air pressure, a vent/air pressure and a vent/vacuum are delivered through a plurality of ports (1501) which are located at the bottom surface of the manifold. The pneumatic schematic indicates the desired number of valves and sensors and how the valves and sensors are connected to the pneumatic air source which includes, for example, air pressure, vacuum and vent. The various ways of configuring the ports will be apparent to those of skill in the art upon reviewing the above description and figures. The number and location of the ports will correspond, for example, to the application requirements of the assay.

The manifold is configured such to provide the necessary combination of air requirements to provide flexibility among the ports according to an embodiment of the present invention. For example, the same pneumatic manifold is used during the processing of a sample card, a reagent card, a reaction card, and an array processing card (hybridization, wash, and stain) on a first base plate assembly and then used to process an array processing card for scanning on the second base plate assembly wherein the external component assembly is a scanning mechanism according to an embodiment of the present invention. The same pneumatic manifold can deliver different air requirements by operating a different computer program according to another embodiment of the present invention.

XI. Base Plate Assembly

According to an embodiment of the present invention, a base plate assembly is provided for system integration. The base plate assembly is used to apply an external processing component to a lab card with a plurality of reagents is provided. In general, performing an assay requires exposure to external processing components such as, for example, cooling, heating, a magnetic field, exposure to a cold area for storage, and scanning. According to another embodiment of the present invention, an imaging instrument is integrated into the base plate assembly.

FIG. 19 illustrates a base plate assembly (2100) for system integration according to an embodiment of the present invention. Mounted on the base plate (2003) is a chassis (2101) with at least one printed circuit board, PCB (2002) in which the temperature requirements are controlled. For example, the heating and cooling times are controlled by switching the power supply (2102) on/off through the PCB (2002). The external processing components, for example, cold region (2004), heating (2005)/cooling (2006), and a magnetic field (2007) are also mounted onto the base plate (2003) inside the pocket (2111) where the lab card (1500) is placed. The cold region (2004) is for reagent storage (0 to 4 degrees Celsius) according to an embodiment of the present invention. A set of supporting features (2110) assures that the lab card is properly seated into the pocket. According to a preferred embodiment of the present invention, the set of supporting features (2110) is a plurality of springs holding the lab card in place. Another set of supporting features (2104) is provided to assure that the pneumatic manifold assembly is securely mounted onto the lab card via the base plate assembly.

Figure 21A:
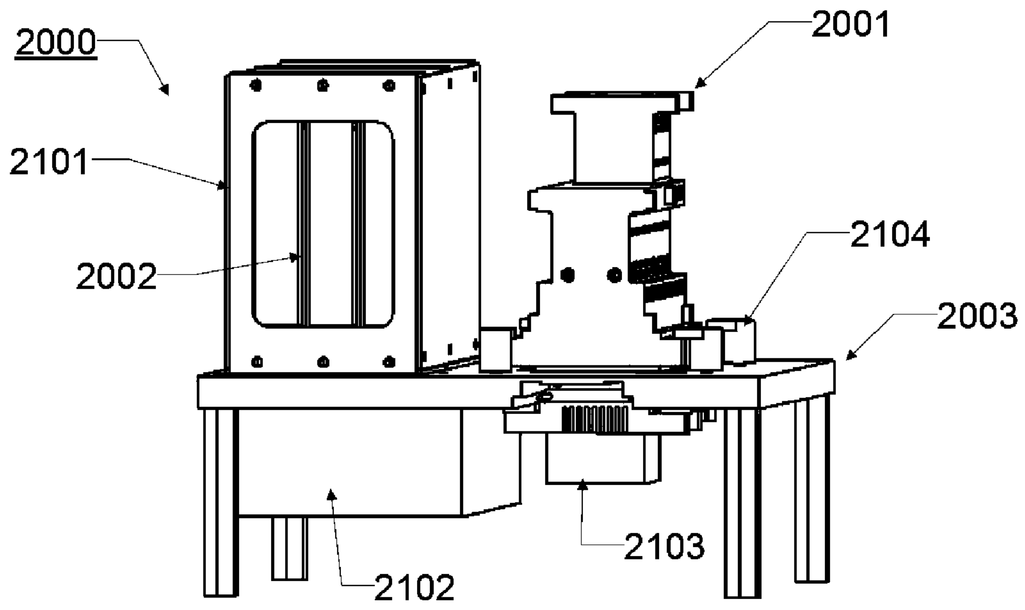
FIGS. 21*a*-21*e* illustrate an overall system which performs a plurality of processes within a closed system according to an embodiment of the present invention.
Figure 21B:
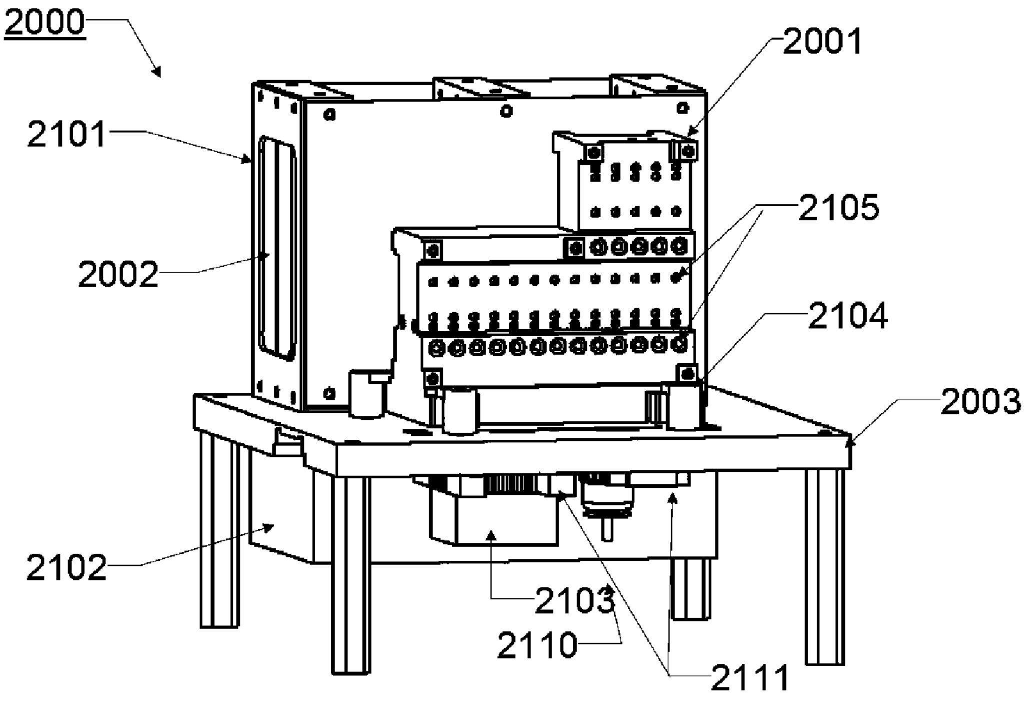
Figure 21C:
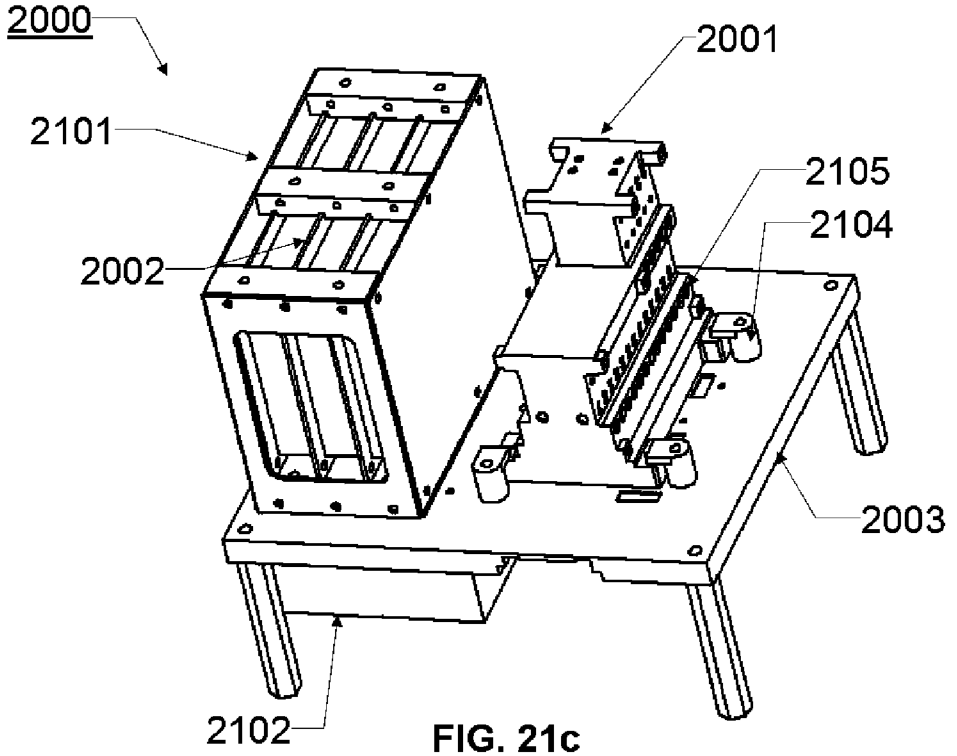
Figure 21D:
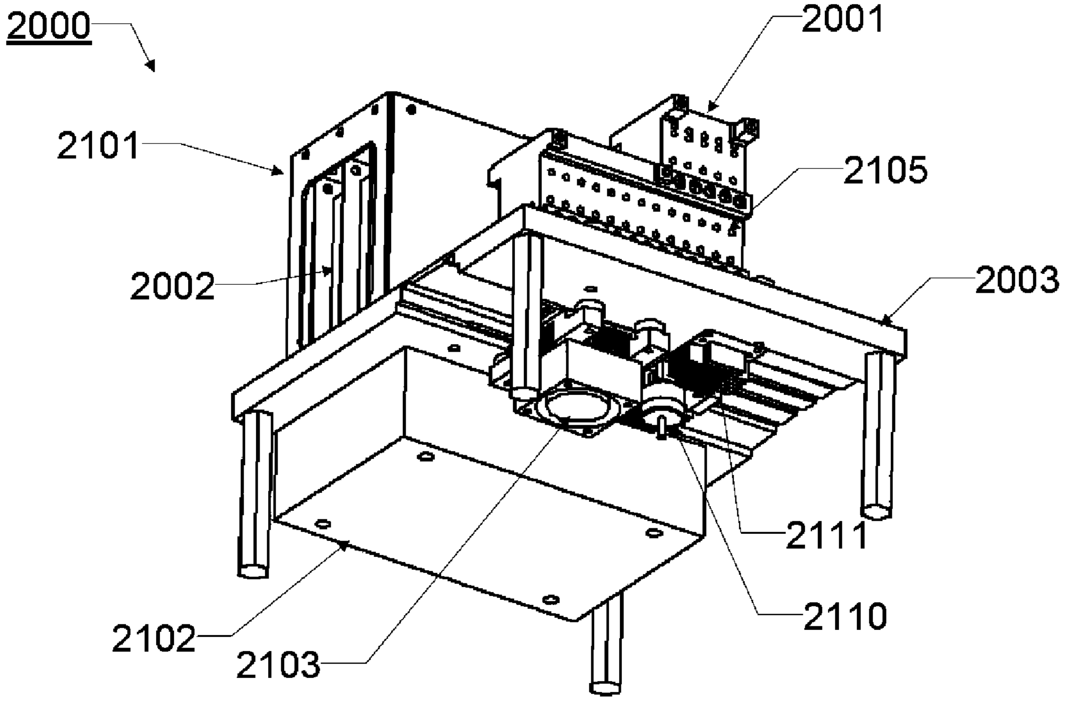
Figure 21E:
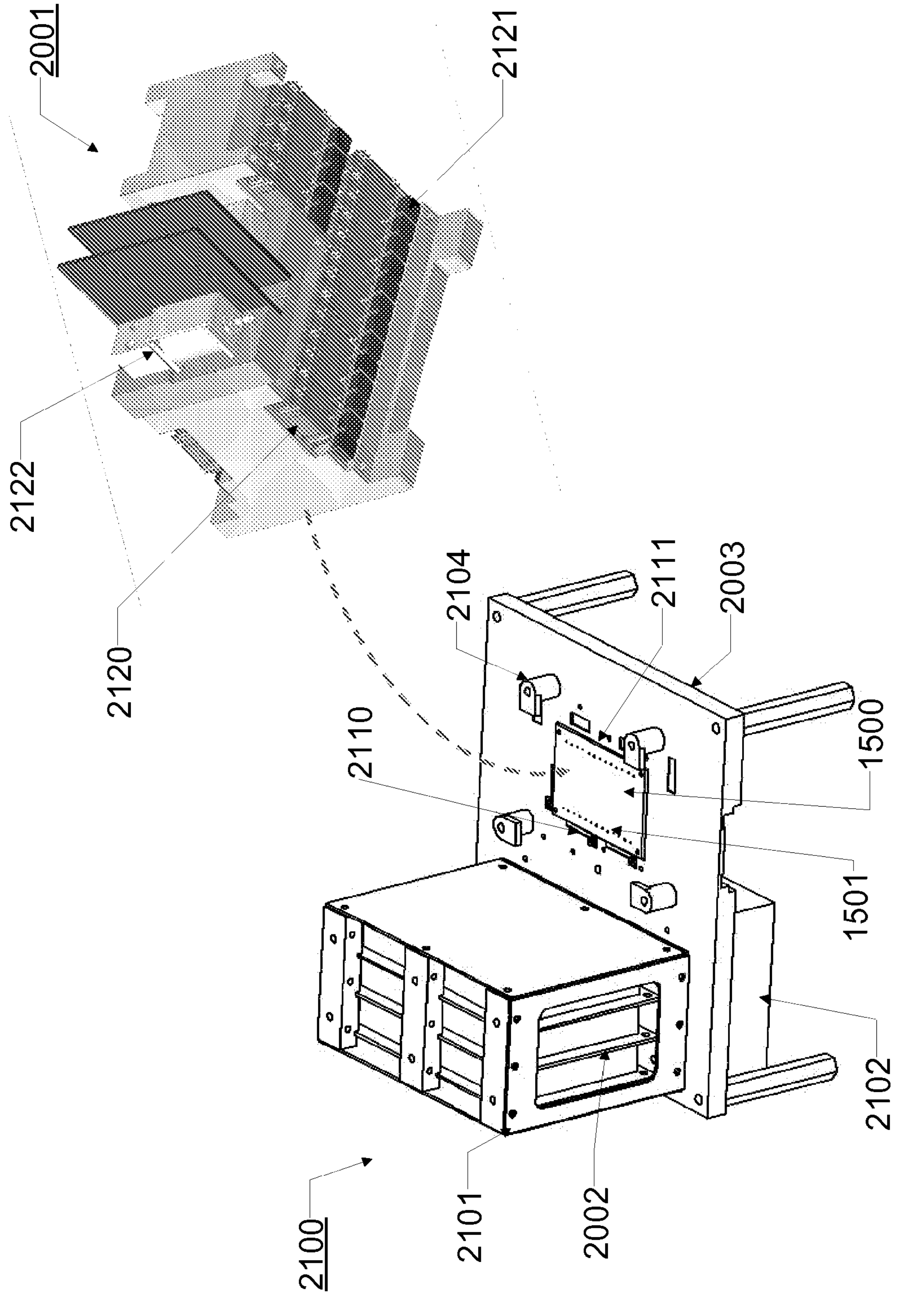

FIG. 21*a-e* illustrates different views of the base plate assembly showing other components. For example, FIGS. 21*b* and 21*d* illustrate the cooling fan (2103), the solenoid (2110) for moving the magnet and the heat sinks (2111).

For PCR amplification methods, denaturation and hybridization cycling will preferably be carried out by repeated heating and cooling of the sample. Accordingly, PCR based amplification chambers will typically include a temperature controller for heating the reaction to carry out the thermal cycling. For example, a heating element or temperature control block may be disposed adjacent the external surface of the amplification chamber thereby transferring heat to the amplification chamber. In this case, preferred devices will include a thin external wall for chambers in which thermal control is desired. This thin wall may be a thin cover element, e.g., polycarbonate sheet, or high temperature tape, i.e. silicone adhesive on Kapton tape (commercially available from, e.g., 3M Corp.). Micro-scale PCR devices have been previously reported. For example, published PCT Application No. WO 94/05414, to Northrup and White, which is hereby incorporated by reference herein in its entirety for all purposes, reports a miniaturized reaction chamber for use as a PCR chamber, incorporating microheaters, e.g., resistive heaters. The high surface area to volume ratio of the chamber allows for very rapid heating and cooling of the reagents disposed therein. Similarly, U.S. Pat. No. 5,304,487 to Wilding et al., which is hereby incorporated by reference herein in its entirety for all purposes, also discusses the use of a microfabricated PCR device.

In preferred embodiments, a chamber or channel used to contain a reagent to be heated will incorporate a thin bottom layer (e.g., thickness of 200 μm) for fast and accurate heat conduction from heaters/coolers. In another preferred embodiments, the chamber or channel will incorporate a controllable heater disposed adjacent to the external thin surface, for example, for thermal cycling of the sample. Thermal cycling is carried out by varying the current supplied to the heater to achieve the desired temperature for the particular stage of the reaction. Alternatively, thermal cycling for the PCR reaction may be achieved by transferring the fluid sample among a number of different reaction chambers or regions of the same reaction chamber, having different, although constant temperatures, or by flowing the sample through a serpentine channel which travels through a number of varied temperature ‘zones’. Heating may alternatively be supplied by exposing the amplification chamber to a laser or other light or electromagnetic radiation source.

A computer and a computer software product (for example, LabView) and at least one PCB are provided to control the various active components (i.e., valves, temperature control, etc.). For example, the programmable temperature control is realized by using, for example, a LabView program to send out an analog signal into the system as a temperature set point. According to an embodiment of the present invention, the lab card has three separate regions including a cold reagent storage region (1804) (e.g., temperature at 4° C.) and two heating (1505)/cooling (1504) regions (e.g., temperature varying from 16 to 70° C. for cooling or heating). The temperature of the three regions are controlled by three PCBs (421) as illustrated in FIG. 19. In yet another example, heat insulation is provided to assure low heat conductivity in the polycarbonate materials.

According to an embodiment of the present invention, an apparatus, method, and system for constructing at least one hole in a substrate are provided which include a mold structure having a top plate, middle plate and a back plate with at least one pin that will penetrate a substrate material during embossing. The top, middle, and back plate are aligned with at least two alignment pins. As the substrate is being held in between the top plate and the middle plate, a delay mechanism is keeping the pin from penetrating through the substrate into a microfeature. A heater is used to heat the mold structure and the substrate to the desired temperature such that the become soft and flowing allowing the mold to be filled with the substrate material. At this point in time, the substrate is soft such that the pin is not damaged while constructing at least one hole in the substrate.

In a preferred embodiment of the present invention, the hole that is being created has a high aspect ratio. The aspect ratio is in the range of 1 to 20, preferably in the range of 1 to 50, and most preferably in the range of 1 to 100. According to another embodiment of the present invention, the substrate material is a material with a glass transition temperature, preferably a thermoplastic. According to another embodiment of the present invention, the delay mechanism comprises at least one heating component. In a preferred embodiment, the heating component is at least two spacers having the same glass transition temperature as the substrate.

According to an embodiment of the present invention, an apparatus, method, and system for imprinting a nanoscale fluid structure onto a substrate are provided which includes a mold structure having a top plate, middle plate and a back plate with at least one nanoscale fluid structure that will imprint onto a substrate material during embossing. The top, middle, and back plate are aligned with at least two alignment pins. As the substrate is being held in between the top plate and the middle plate, a delay mechanism is keeping the nanoscale fluid structure from penetrating through the substrate into a microfeature.

A heater is used to heat the mold structure and the substrate to the desired temperature such that the become soft and flowing allowing the mold to be filled with the substrate material. At this point in time, the substrate is soft such that the nanoscale fluid structure is not damaged while imprinting onto the substrate.

According to an embodiment of the present invention, the substrate material is a material with a glass transition temperature, preferably a thermoplastic. According to another embodiment of the present invention, the delay mechanism comprises at least one heating component. In a preferred embodiment, the heating component is at least two spacers having the same glass transition temperature as the substrate.

EXAMPLES

Example 1

Lab Card for Performing WTA Assay

Experiments were performed to perform the WTA assay protocol as illustrated in FIG. 14 using a lab card (1100), base plate assembly (1700) and a pneumatic manifold (1601). All the twelve reagents to produce a sample for hybridization were stored in the reaction card (1100). The reaction card provided the mirofeatures to perform the required reactions illustrated in FIG. 14. A pneumatic manifold was used to deliver the required air requirements necessary to perform the reactions. The base plate assembly (1700) included a cold region (1604), heating/cooling (1605/1606), and a magnetic field (1607).

The assay began with placing the reaction card (1100) into the pocket (1702) of the base plate assembly (1700). Lab View was used to operate the system and provide temperature control. The Total RNA (1410) sample was transferred from the storage chamber to the reaction chamber where the second reagent, 1st strand buffer (1411) was added to synthesize the $1^{st}$ strand cDNA. After the $2^{nd}$ strand cDNA was synthesized with the addition of the third reagent (1412), the solution was incubated with the addition of the fourth reagent (1413). EDTA (1414), the fifth reagent, was added to make a total volume of 16.2 μl. The beads purification step involved four reagents: magnetic beads, alcohol, alcohol, and water. Afterwards, cDNA fragmentation (1415) was completed with the addition of the tenth reagent. The eleventh reagent (1416) was added and the Terminal Labeling step was completed. Finally, the last reagent, EDTA (1417), was added and the resulting sample was then hybridized with an Affymetrix U133A chip. All 12 reagents were stored in the reaction card and all the reactions in this WTA assay protocol was processed within the reaction card.

Example 2

Performing an Assay Using a Reaction Card

Experiments were performed to perform the WTA assay protocol as illustrated in FIG. 14 using a lab card (1100), base plate assembly (1700) and a pneumatic manifold (1601). All the twelve reagents to produce a sample for hybridization were stored in the reaction card (1100). The reaction card provided the mirofeatures to perform the required reactions illustrated in FIG. 14. A pneumatic manifold was used to deliver the required air requirements necessary to perform the reactions. The base plate assembly (1700) included a cold region (1604), heating/cooling (1605/1606), and a magnetic field (1607).

The assay began with placing the reaction card (1100) into the pocket (1702) of the base plate assembly (1700). Lab View was used to operate the system and provide temperature control. The Total RNA (1410) sample was transferred from the storage chamber to the reaction chamber where the second reagent, 1st strand buffer (1411) was added to synthesize the $1^{st}$ strand cDNA. After the $2^{nd}$ strand cDNA was synthesized with the addition of the third reagent (1412), the solution was incubated with the addition of the fourth reagent (1413). EDTA (1414), the fifth reagent, was added to make a total volume of 16.2 μl. The beads purification step involved four reagents: magnetic beads, alcohol, alcohol, and water. Afterwards, cDNA fragmentation (1415) was completed with the addition of the tenth reagent. The eleventh reagent (1416) was added and the Terminal Labeling step was completed. Finally, the last reagent, EDTA (1417), was added and the resulting sample was then hybridized with an Affymetrix U133A chip. All 12 reagents were stored in the reaction card and all the reactions in this WTA assay protocol was processed within the reaction card.

Example 3

System Using a Set of Lab Cards

A set of lab cards are utilized to perform an assay: a sample card, a reaction card, an array processing card for hybridizing, washing, and staining and an array processing card for scanning. All the lab cards are universal such that each lab card can be utilized in a plurality of various assays, applications, etc. For example, a universal reagent card provides a number of lab card features for a plurality of assays or reactions.

At least one sample from a patient is stored in a sample card. The sample is then transferred into a reagent card where all the reagents are stored to perform the assay, for example, the WTA assay as described in the first example. The resulting sample is then transferred to an array processing card that includes a plurality of array pegs for hybridizing, washing and staining. After processing the arrays, the array pegs are then transferred and scanned into an array processing card specifically for scanning.

Example 4

Method for Making a Through Hole

A lab card was fabricated using convention embossing. The lab card was made from a thermoplastic and consisted of three pieces: top, middle and bottom. The middle piece required two through holes which were formed during the embossing process according to an embodiment of the present invention. The mold structure included a top plate (1201), a middle plate (1202), a back plate (1203) with two pins (1207) that will penetrate the substrate material of the middle piece during embossing as shown in FIGS. 12*a-c*. Four alignment pins (1208) were used to align the parts. Four spacers (1206) made from the same thermoplastic material as the middle piece were used as a delay mechanism to keep the pins from penetrating through the substrate into the microfeatures (1209). The whole apparatus was placed in a heater was to heat the mold structure, the middle piece (103), and the spacers (1206) to the desired temperature which allowed the pins to penetrate through the middle piece and construct the two through holes when the material became soft and flowing.

IV. Conclusion

It is to be understood that the above description is intended to be illustrative and not restrictive. Many variations of the invention will be apparent to those of skill in the art upon reviewing the above description and figures. All cited references, including patent and non-patent literature, are incorporated by reference herein in their entireties for all purposes.

What is claimed is:

1. An apparatus for constructing at least one microchannel for a microfluidic device in a molded substrate, the apparatus comprising:

a mold structure having a top plate, a middle plate and a back plate with at least one microchannel pin fixedly connected to the back plate, wherein the mold structure forms a cavity where a solid unmolded substrate material can be molded, wherein a bottom surface of the top plate is planar, wherein a top surface of the middle plate is planar, wherein the at least one microchannel pin has an invariant diameter in the range of 10-500 microns, wherein the middle plate comprises at least one passage corresponding to each microchannel pin through which the at least one microchannel pin may pass during a molding operation, the at least one middle plate passage having a diameter equal to that of the corresponding microchannel pin, and wherein the planar bottom surface of the top plate and the planar top surface of the middle plate mold the substrate material such that the molded substrate has a planar top surface and a planar bottom surface;

a delay mechanism that when active prevents penetration of the substrate material by the at least one microchannel pin: wherein deactivation of the delay mechanism allows the at least one microchannel pin to penetrate the substrate material to form at least one microchannel, wherein the at least one microchannel has an invariant diameter, wherein a top opening of the at least one microchannel is flush with the planar top surface of the molded substrate, wherein a bottom opening of the at least one microchannel is flush with the planar bottom surface of the molded substrate, and wherein the planar top and bottom surfaces of the molded substrate and the at least one microchannel are suitable for joining with at least one other molded substrate to form a fluid tight microfluidic device possessing at least one microchannel;

at least two alignment pins, wherein the alignment pins align the top, middle and back plates; and a heater to heat the mold structure and the substrate material to a desired temperature such that the substrate material becomes soft and flowing allowing the substrate material to be molded within the cavity, wherein heating to the desired temperature deactivates the delay mechanism to allow penetration of the substrate material by the at least one microchannel pin, and wherein the substrate material at the desired temperature is soft such that the at least one microchannel pin is not damaged while constructing the at least one microchannel in the substrate material, thereby constructing at least one microchannel for a microfluidic device in the molded substrate.

2. An apparatus according to claim 1, wherein the microchannel has an aspect ratio of more than one, wherein the aspect ratio is the thickness of the molded substrate to the diameter of the microchannel.

3. An apparatus according to claim 2, wherein the aspect ratio is in the range of 1 to 20.

4. An apparatus according to claim 2, wherein the aspect ratio is in the range of 1 to 50.

5. An apparatus according to claim 2, wherein the aspect ratio is in the range of 1 to 100.

6. An apparatus according to claim 1, wherein the apparatus further comprises at least one nano structure pin, wherein the nano structure pin imprints a nano structure on the substrate material, and wherein the nano structure is not a microchannel.

7. An apparatus according to claim 1, wherein the delay mechanism comprises at least one heating component.

8. An apparatus according to claim 1, wherein the top plate has a bottom layer with a mirror finish, and wherein the bottom layer of the top plate modifies the top surface of the molded substrate such that the top surface is at least partially transparent, thereby allowing observation of fluids present in the molded substrate.

9. An apparatus according to claim 1, wherein the molded substrate has a length in a range of 1 to 20 cm, a width in a range of 1 to 15 cm, and a thickness in a range of 0.1 to 2.5 cm.

10. An apparatus according to claim 9, wherein the molded substrate has a length of in a range of 2 to 15 cm, a width in a range of 2 to 20 cm, and a thickness in a range of 0.1 to 1.5 cm.

11. An apparatus according to claim 10, wherein the molded substrate has a length of 7.5 cm, a width of 5.1 cm, and a thickness of 0.64 cm.

12. An apparatus for constructing at least one microchannel and at least one nano structure for a microfluidic device in a molded substrate, the apparatus comprising:

a mold structure having a top plate, a middle plate and a back plate with at least one microchannel pin fixedly connected to the back plate and at least one nano structure pin mounted on the microchannel pin, wherein the mold structure forms a cavity where a solid unmolded substrate material can be molded, wherein a bottom surface of the top plate is planar, wherein a top surface of the middle plate is planar, wherein the bottom surface of the top plate has a bottom layer with a mirror finish, wherein the at least one microchannel pin has an invariant diameter in the range of 10 to 500 microns, wherein the at least one nano structure pin has a diameter smaller than that of the microchannel pin, wherein the middle plate comprises passages, corresponding to the at least one microchannel pin and the at least one nano structure pin, through which the at least one microchannel pin and the at least one nano structure pin may pass during a molding operation, the passages having a diameter equal to that of their corresponding microchannel pins, wherein the planar bottom surface of the top plate and the planar top surface of the middle plate mold the substrate material such that the molded substrate has a planar top surface and a planar bottom surface, and wherein the bottom layer of the top plate modifies the top surface of the molded substrate such that the top surface is at least partially transparent;

a delay mechanism that when active prevents penetration of the substrate material by the at least one microchannel pin and the at least one nano structure pin, wherein deactivation of the delay mechanism allows the at least one microchannel pin and the at least one nano structure pin to penetrate the substrate material to form at least one microchannel and at least one nano structure, wherein the at least one microchannel has an invariant diameter, wherein a bottom opening of the at least one microchannel is flush with the planar bottom surface of the molded substrate, and wherein the planar top and bottom surfaces of the molded substrate and the at least one microchannel are suitable for joining with at least one other molded substrate to form a fluid tight microfluidic device possessing at least one microchannel;

at least two alignment pins, wherein the alignment pins align the top, middle and back plates; and a heater to heat the mold structure and the substrate material to a desired temperature such that the substrate material becomes soft and flowing allowing the substrate material to be molded within the cavity, wherein heating to the desired temperature deactivates the delay mechanism to allow penetration of the substrate material by the at least one microchannel pin and the at least one nano structure pin, and wherein the substrate material at the desired temperature is soft such that the at least one microchannel pin and the at least one nano structure pin are not damaged while constructing the at least one microchannel and the at least one nano structure in the substrate material, thereby constructing at least one microchannel and at least one nanostructure for a microfluidic device in the molded substrate.

13. An apparatus according to claim 12, wherein the microchannel has an aspect ratio of more than one, wherein the aspect ratio is the thickness of the molded substrate to the diameter of the microchannel.

14. An apparatus according to claim 13, wherein the aspect ratio is in the range of 1 to 100.

15. An apparatus according to claim 14, wherein the aspect ratio is in the range of 1 to 50.

16. An apparatus according to claim 15, wherein the aspect ratio is in the range of 1 to 20.

17. An apparatus according to claim 12, wherein the delay mechanism comprises at least one heating component.

* * * * *